United States Patent
Murayama et al.

(10) Patent No.: US 10,418,858 B2
(45) Date of Patent: Sep. 17, 2019

(54) WIRELESS POWER SUPPLY SYSTEM AND POWER RECEIVER

(71) Applicant: IHI CORPORATION, Tokyo (JP)

(72) Inventors: Takahiko Murayama, Tokyo (JP); Jun Araki, Tokyo (JP); Toshio Nakamura, Tokyo (JP)

(73) Assignee: IHI Corporation, Tokyo (JP)

( * ) Notice: Subject to any disclaimer, the term of this patent is extended or adjusted under 35 U.S.C. 154(b) by 9 days.

(21) Appl. No.: 15/840,885

(22) Filed: Dec. 13, 2017

(65) Prior Publication Data

US 2018/0109149 A1 Apr. 19, 2018

Related U.S. Application Data

(63) Continuation of application No. PCT/JP2016/071825, filed on Jul. 26, 2016.

(30) Foreign Application Priority Data

Aug. 28, 2015 (JP) .................. 2015-169841

(51) Int. Cl.
*B60L 11/18* (2006.01)
*H02J 50/12* (2016.01)
(Continued)

(52) U.S. Cl.
CPC .............. *H02J 50/12* (2016.02); *B60L 53/12* (2019.02); *H01F 38/14* (2013.01); *H02J 50/90* (2016.02);
(Continued)

(58) Field of Classification Search
None
See application file for complete search history.

(56) References Cited

U.S. PATENT DOCUMENTS

| | | | | |
|---|---|---|---|---|
| 9,672,975 B2 * | 6/2017 | Keeling | .................. | B60L 53/36 |
| 2011/0080056 A1 * | 4/2011 | Low | ........................ | H02J 5/005 |
| | | | | 307/104 |

(Continued)

FOREIGN PATENT DOCUMENTS

JP 2010-063324 A 3/2010
JP 2010-288441 A 12/2010
(Continued)

OTHER PUBLICATIONS

Murayama, T., "Consideration for High Efficiency of Wireless Charging System," Heisei 27 Nen National Convention Record I.E.E. Japan, the Institute of Electrical Engineers of Japan, Mar. 5, 2015 (Mar. 5, 2015), p. 259.
(Continued)

*Primary Examiner* — Jared Fureman
*Assistant Examiner* — Aqeel H Bukhari
(74) *Attorney, Agent, or Firm* — Volpe and Koenig, P.C.

(57) ABSTRACT

A wireless power supply system includes a power transmitter having a power-transmitting coil to which AC power of a frequency is input from a power source; and a power receiver having a power-receiving coil magnetically coupled to the power-transmitting coil at a coupling coefficient, and a first power-receiving-side series element coupled in series to the power-receiving coil and having imaginary impedance, in which the frequency, the coupling coefficient and the imaginary impedance are determined on the basis of satisfying a predetermined relationship.

20 Claims, 13 Drawing Sheets

(51) Int. Cl.
    *H01F 38/14*     (2006.01)
    *B60L 53/12*     (2019.01)
    *H02J 50/90*     (2016.01)
    *H02J 50/80*     (2016.01)

(52) U.S. Cl.
    CPC ........... *H02J 50/80* (2016.02); *Y02T 10/7005* (2013.01); *Y02T 10/7072* (2013.01); *Y02T 90/122* (2013.01); *Y02T 90/14* (2013.01)

(56) References Cited

U.S. PATENT DOCUMENTS

| | | |
|---|---|---|
| 2012/0056580 A1 | 3/2012 | Kai et al. |
| 2012/0228953 A1* | 9/2012 | Kesler .................. H03H 7/40 307/104 |
| 2013/0002034 A1 | 1/2013 | Onizuka et al. |
| 2013/0082538 A1 | 4/2013 | Wambsganss et al. |
| 2013/0088088 A1 | 4/2013 | Wambsganss et al. |
| 2017/0033605 A1 | 2/2017 | Nakamura et al. |

FOREIGN PATENT DOCUMENTS

| | | |
|---|---|---|
| JP | 2012-130173 A | 7/2012 |
| JP | 2015-065756 A | 4/2015 |
| JP | 2015-156741 A | 8/2015 |
| WO | 2011033660 A1 | 3/2011 |
| WO | 2015/170658 A1 | 11/2015 |

OTHER PUBLICATIONS

Joy et al., "Impact of circuit parameters in contactless power transfer system," 2014 IEEE International Conference Power Electronics, Drives and Energy Systems (PEDES), Mumbai, pp. 1-6 (2014).

* cited by examiner

WIRELESS POWER SUPPLY SYSTEM AND POWER RECEIVER

This application is a Continuation application based on International Application No. PCT/JP2016/071825, filed Jul. 26, 2016, which claims priority on Japanese Patent Application No. 2015-169841, filed Aug. 28, 2015, the contents of which are incorporated herein by reference.

TECHNICAL FIELD

The present disclosure relates to a wireless power supply system and a power receiver.

BACKGROUND

In recent years, there have been known wireless power supply systems that supply electric power using electromagnetic induction, magnetic field resonance or the like from a power transmitter including a power-transmitting coil to a power receiver including a power-receiving coil. In such systems, magnetic flux generated by the power-transmitting coil is interlinked with the power-receiving coil, whereby electric power is transmitted between the coils. For this reason, the efficiency of power transmission (transmission efficiency) is influenced by a positional relationship between the power-transmitting coil and the power-receiving coil.

The battery charging of an electric vehicle has attracted attention as one application destination of the wireless power supply system. The power receiver is mounted on the vehicle in this case. However, there is a limitation to improve driving accuracy (stop accuracy), and it is difficult to park a vehicle in accurate alignment with a predetermined position for the purpose of charging. For this reason, there is a possibility of a positional relationship between the power-transmitting coil and the power-receiving coil varying each time a vehicle is parked. When the relative positions of the power-transmitting coil and the power-receiving coil deviate from a desired positional alignment, the efficiency of transmission may decrease due to a change in a coupling coefficient between the coils.

In the related art, a technique for limiting a decrease in the efficiency of charging when a positional misalignment between coils occurs has been proposed (see, for example, Patent Document 1). A power supply device (power transmitter) disclosed in Patent Document 1 changes the frequency of AC power which is supplied from an inverter circuit (power source) to a power-transmitting coil, when the efficiency of transmission decreases due to the occurrence of positional misalignment. The power supply device achieves an improvement in the efficiency of charging through this frequency change.

DOCUMENT OF RELATED ART

Patent Document

[Patent Document 1] Japanese Unexamined Patent Application, First Publication No. 2012-130173

SUMMARY

As disclosed in Patent Document 1, impedance of the power-receiving side seen from the inverter circuit is expressed by a function of the frequency of electric power supplied to the power-transmitting coil and the coupling coefficient between the power-transmitting coil and the power-receiving coil. For this reason, by changing the frequency when the positional misalignment occurs and the coupling coefficient changes, a change in the coupling coefficient and the frequency incurs a change in impedance. The output AC voltage of the inverter circuit (or corresponding input DC voltage of the inverter circuit) also changes in order to supply desired electric power, due to such a change in impedance.

When the output voltage of the inverter circuit becomes higher, it is necessary to use an element having a high withstand voltage as, for example, a circuit element of the power transmitter, and thus an increase in the size of the element may be incurred. Note that the circuit element of the power transmitter is, for example, a field effect transistor (FET) as a switching element of the inverter circuit. In addition, when the output voltage of the inverter circuit becomes lower, an output current from the inverter circuit is required to be increased in order to transmit desired electric power. In a case where the output current becomes larger, a Joule heat loss in an element or a wiring through which this current flows may increase, and the efficiency of charging may decrease.

In view of the above-described circumstances, an object of the present disclosure is to provide a wireless power supply system and a power receiver which are capable of suppressing a fluctuation in impedance of a power-receiving side seen from a power source, when a coupling coefficient changes.

A wireless power supply system according to one aspect of the present disclosure includes: a power transmitter; and a power receiver, the power transmitter includes a power-transmitting coil to which AC power of a frequency is input from a power source, the power receiver includes: a power-receiving coil magnetically coupled to the power-transmitting coil at a coupling coefficient; and a first power-receiving-side series element coupled in series to the power-receiving coil and having imaginary impedance $jZ_{S2i}$, and the frequency, the coupling coefficient and the imaginary impedance are determined on the basis of satisfying the following formula, $$\left|\frac{I_2}{I_1}\right| = K_I \sqrt{\frac{L_1}{L_2}} \qquad \text{Formula (1)}$$

where $L_1$ is self-inductance of the power-transmitting coil, $L_2$ is self-inductance of the power-receiving coil, $I_1$ is a current flowing through the power-transmitting coil, $I_2$ is a current flowing through the power-receiving coil, and $K_I$ is a coefficient.

A power receiver according to another aspect of the present disclosure receives electric power wirelessly from a power transmitter including a power-transmitting coil to which AC power of a frequency is input from a power source, and includes: a power-receiving coil magnetically coupled to the power-transmitting coil at a coupling coefficient; and a first power-receiving-side series element coupled in series to the power-receiving coil and having imaginary impedance $jZ_{S2i}$, and the frequency, the coupling coefficient and the imaginary impedance are determined on the basis of satisfying the following formula, $$\left|\frac{I_2}{I_1}\right| = K_I \sqrt{\frac{L_1}{L_2}} \qquad \text{Formula (9)}$$

where $L_1$ is self-inductance of the power-transmitting coil, $L_2$ is self-inductance of the power-receiving coil, $I_1$ is a current flowing through the power-transmitting coil, $I_2$ is a current flowing through the power-receiving coil, and $K_f$ is a coefficient.

According to the present disclosure, it is possible to suppress a fluctuation in impedance of a power-receiving side seen from a power source, when a coupling coefficient changes.

DESCRIPTION OF EMBODIMENTS

Hereinafter, embodiments of the present disclosure will be described with reference to the accompanying drawings.

First Embodiment

Figure 1:
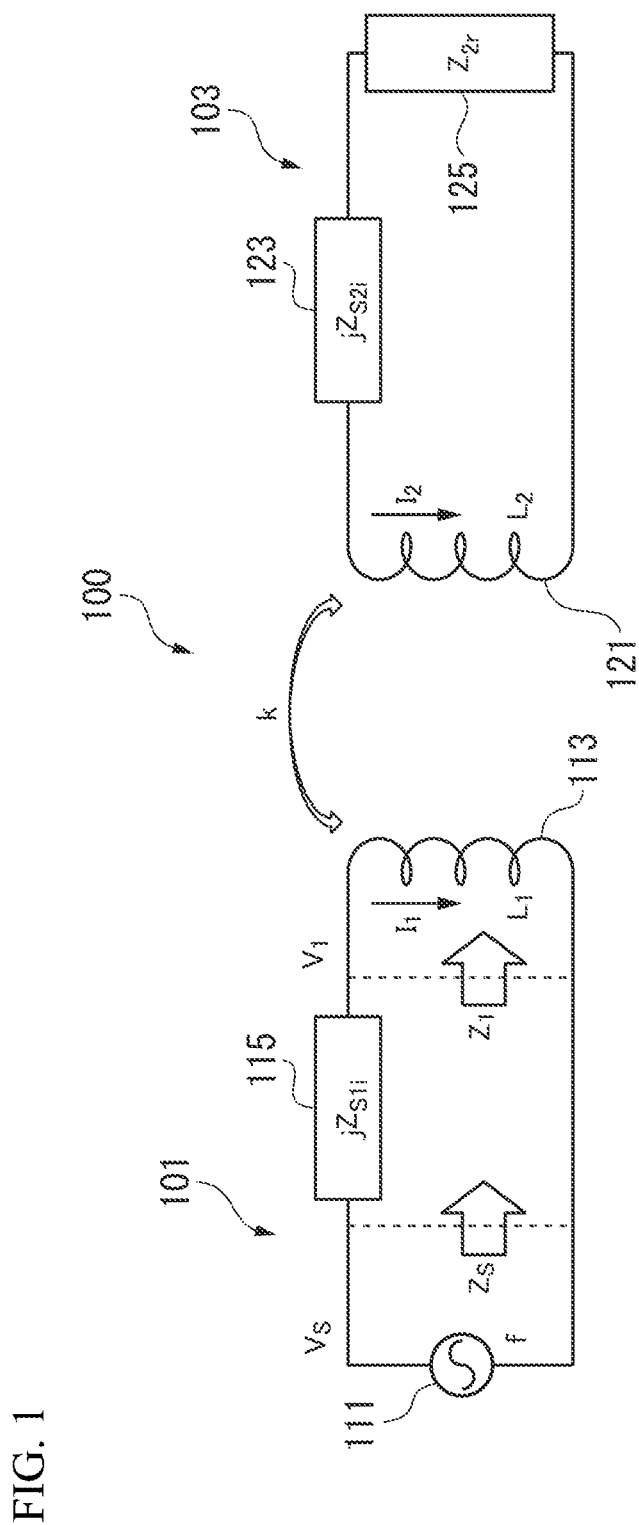
FIG. 1 is a circuit diagram of a wireless power supply system according to a first embodiment of the present disclosure.

FIG. 1 is a circuit diagram of a wireless power supply system according to a first embodiment of the present disclosure. A wireless power supply system 100 includes a power transmitter 101 and a power receiver 103. The power transmitter 101 includes a power-transmitting coil 113 described later, and the power receiver 103 include a power-receiving coil 121 described later.

The power transmitter 101 transmits electric power to the power receiver 103 wirelessly through magnetic coupling between the coils. A method of transmitting electric power under magnetic coupling between coils is, for example, an electromagnetic induction method or a magnetic resonance method. Application examples of the wireless power supply system 100 include, for example, charging systems or driving systems of moving objects such as an electric vehicle (vehicle) or an underwater sailing body, home electric appliances, or medical instruments. The power-transmitting coil 113 and the power-receiving coil 121 are, for example, solenoid-type or circular-type coils. Meanwhile, the solenoid-type is an aspect in which a conducting wire which forms a coil is helically wound in three-dimensional space. The circular-type coil is an aspect in which a conducting wire which forms a coil is spirally wound on a plane.

The power transmitter 101 includes the power-transmitting coil 113 to which an AC power is input from a power source 111 that outputs AC power of a frequency f, and an element (power-transmission-side series element) 115 having imaginary impedance. That is, the power-transmitting coil 113 is configured to receive AC power of a frequency f from the power source 111. The description of "AC power of a frequency f" means that a frequency of an AC voltage or an alternating current output from the power source 111 is f. The element 115 is coupled in series to the power source 111 and the power-transmitting coil 113. Self-inductance of the power-transmitting coil 113 is denoted by $L_1$, and a current $I_1$ (phasor current) flows through the power-transmitting coil 113. Meanwhile, the absolute value of a current displayed by phasor may be an effective value, or may be a peak value.

The power source 111 is, for example, a power supply circuit such as an inverter circuit or an AC power source such as a commercially available power source, and outputs an AC voltage $V_S$ (phasor voltage) of a frequency f (angular frequency ω).

AC power which is supplied power by the source 111 is received by the power-transmitting coil 113 through the element 115. The inverter circuit can be realized by methods conventionally known such as a half-bridge method or a full-bridge method. Meanwhile, the absolute value of a voltage displayed by phasor may be an effective value, or may be a peak value.

When the power source 111 is constituted by an inverter circuit, the inverter circuit includes a plurality of switching elements (such as field effect transistors), and these elements are switched at a switching frequency f, whereby AC power of the frequency f is output from the power source 111. That is, a switching frequency is controlled in order to change the frequency of an inverter circuit output.

Meanwhile, in some configurations of inverter circuits, there may be a case where a frequency of an alternating current output from the inverter circuit does not coincide with a switching frequency. In addition, DC power is input to the inverter circuit, but this DC power is, for example, power which is supplied from a DC power source or power which is converted from AC power to DC power by a power conversion circuit. The power conversion circuit includes, for example, a rectifying function, and has a power factor correction (PFC) function or a voltage conversion function selectively. The voltage conversion function is realized by, for example, a non-insulation-type DC-DC converter using a chopper circuit or an insulation-type DC-DC converter using a transformer or the like.

The element 115 is constituted, for example, by a reactance element such as an inductor (reactor, coil) or a capacitor, or a plurality of elements of a combination of such reactance elements, and the imaginary impedance of the element 115 is denoted by $jZ_{S1i}$ (j is an imaginary unit and $Z_{S1i}$ is an imaginary part). Hereinafter, the imaginary part is a real number. When the element 115 is constituted by a plurality of elements, for example, it is possible to provide one element between one terminal of the power source 111 and the coil 113 (in one coupling line between the power source 111 and the coil 113 of FIG. 1), and to provide one element between the other terminal of the power source 111 and the coil 113 (in the other coupling line between the power source 111 and the coil 113 of FIG. 1). In this case, the impedance of the element 115 becomes equal to the synthetic impedance of these two elements. When the element is a capacitor, the impedance of the element 115 is realized by a plurality of capacitors, and thus it is possible to reduce a voltage which is applied to each capacitor. Thus, it is possible to adopt a capacitor having a lower withstand voltage, and to reduce the size of the power transmitter 101.

The power receiver 103 includes the power-receiving coil 121 configured to be magnetically coupled to the power-transmitting coil 113 at a coupling coefficient k, and an element (power-receiving-side series element) 123 having imaginary impedance. The element 123 is coupled in series to the power-receiving coil 121. In addition, a load 125 having real impedance is coupled in series to the element 123. Self-inductance of the power-receiving coil 121 is denoted by $L_2$, and a current $I_2$ (phasor current) flows through the power-receiving coil 121.

There may by a case where a fluctuation range of the coupling coefficient k due to the positional misalignment between the power-transmitting coil 113 and the power-receiving coil 121 is determined in advance. For example, when the coupling coefficient between the power-transmitting coil 113 and the power-receiving coil 121 becomes lower due to the positional misalignment, the power efficiency decreases. For this reason, from the point of view of realizing desired power efficiency, a lower limit $k_{min}$ of the coupling coefficient k which realizes the lowest allowable value of the power efficiency is present. An upper limit $k_{max}$ of desired coupling coefficient k is a maximum value practicable for the wireless power supply system 100. In addition, when a range of the positional misalignment of the wireless power supply system 100 is determined in advance, the fluctuation range of the coupling coefficient k can be determined by obtaining the coupling coefficient k of the wireless power supply system 100 within this range. Alternatively, the fluctuation range may be a use permission range within which the normal operation of the wireless power supply system 100 is guaranteed. This use permission range is described in, for example, a specification sheet or a use manual.

The self-inductances of the power-transmitting coil 113 and the power-receiving coil 121 may be changed according to the coupling coefficient k. In this case, a changing range of the self-inductances is present according to change in the coupling coefficient within the fluctuation range. Accordingly, the self-inductances of the power-transmitting coil 113 and the power-receiving coil 121 may be set to a value within the changing range. The self-inductances may be set to the mean value of values within the changing range.

The element 123 is a component which is constituted by a reactance element such as an inductor (reactor, coil) or a capacitor, or a plurality of elements of a combination of such reactance elements. The imaginary impedance of the element 123 is denoted by $jZ_{S2i}$. The load 125 is, for example, a power storage device (such as a lithium-ion secondary battery, a nickel-hydrogen secondary battery, or a high-capacity electric double layer capacitor) that stores electric power, or an electric device or an electronic device which is driven by electric power. The real impedance of the load 125 is denoted by $Z_{2r}$. Meanwhile, when the element 123 is constituted by a plurality of elements, the synthetic impedance of these elements may be constituted by imaginary impedance and real impedance. In this case, the imaginary impedance of the synthetic impedance is $jZ_{S2i}$, and the synthesis of the real impedance of the synthetic impedance and the real impedance of the load 125 is $Z_{2r}$.

In addition, when the power conversion circuit is coupled to the power-receiving coil 121 in addition to a reactance element or a secondary battery, the real part of the synthetic impedance of the reactance element, the secondary battery, and the power conversion circuit constitutes the real impedance $Z_{2r}$ of the load 125, and the imaginary part constitutes the imaginary impedance $Z_{S2i}$ of the element 123. Meanwhile, the power conversion circuit can be constituted by various circuits such as a rectifying circuit, or a combination of the rectifying circuit and a DC-DC converter.

The mutual inductance M between the power-transmitting coil 113 and the power-receiving coil 121 satisfies the relational formula of $M^2=k^2L_1L_2$, and thus the circuit equation of FIG. 1 becomes Formula (10).

$$\begin{bmatrix} j\omega L_1 + jZ_{S1i} & j\omega k\sqrt{L_1 L_2} \\ j\omega k\sqrt{L_1 L_2} & j\omega L_2 + Z_{2r} + jZ_{S2i} \end{bmatrix} \begin{bmatrix} I_1 \\ I_2 \end{bmatrix} = \begin{bmatrix} V_S \\ 0 \end{bmatrix} \quad \text{Formula (10)}$$

When a relational formula between currents $I_1$ and $I_2$ is determined from Formula (10), Formula (11) is obtained.

$$\frac{I_2}{I_1} = -\frac{j\omega k\sqrt{L_1 L_2}}{Z_{2r} + j(\omega L_2 + Z_{S2i})} \quad \text{Formula (11)}$$

When Formula (12) is established, Formula (13) is established from Formula (11) and Formula (12).

$$\left|\frac{I_2}{I_1}\right| = \sqrt{\frac{L_1}{L_2}} \quad \text{Formula (12)}$$

$$\frac{\omega^2 k^2 L_2^2}{Z_{2r}^2 + (\omega L_2 + Z_{S2i})^2} = 1 \quad \text{Formula (13)}$$

Next, when impedance $Z_1$ (impedance which includes the power-transmitting coil 113) of the power-receiving side seen from the power-transmitting coil 113 is determined by Formula (10) and Formula (11), the impedance $Z_1$ is represented by Formula (14). Meanwhile, $V_1$ in Formula (14) indicates a voltage which is applied to the power-transmitting coil. In addition, the description of "impedance of the power-receiving side seen from a component" means that, when the power-transmission side of the wireless power supply system is set to an upstream side, and the power-receiving side of the wireless power supply system is a downstream side, the impedance is "impedance on the downstream side from this component" (the same hereinafter).

$$Z_1 = \frac{V_1}{I_1} = j\omega L_1 + j\omega k\sqrt{L_1 L_2}\frac{I_2}{I_1}$$
$$= \frac{\omega^2 k^2 L_2^2}{Z_{2r}^2 + (\omega L_2 + Z_{S2i})^2}\frac{L_1}{L_2}Z_{2r} -$$
$$j\frac{L_1}{L_2}\left(\frac{\omega^2 k^2 L_2^2}{Z_{2r}^2 + (\omega L_2 + Z_{S2i})^2}Z_{S2i} + \left(\frac{\omega^2 k^2 L_2^2}{Z_{2r}^2 + (\omega L_2 + Z_{S2i})^2} - 1\right)\omega L_2\right)$$

Formula (14)

Each parameter (impedance of an element, frequency, and coupling coefficient) of the wireless power supply system 100 is determined or controlled so that Formula (12) is established. In this case, Formula (13) is substituted into Formula (14), and thus Formula (14) becomes Formula (15).

$$Z_1 = \frac{L_1}{L_2}(Z_{2r} - jZ_{S2i}) \quad \text{Formula (15)}$$

Thus, impedance $Z_S$ (impedance which does not include the power source 111) of the power-receiving side seen from the power source 111 is represented by Formula (16).

$$Z_S = \frac{L_1}{L_2}\left(Z_{2r} + j\left(\frac{L_2}{L_1}Z_{S1i} - Z_{S2i}\right)\right) \quad \text{Formula (16)}$$

From Formula (16), the impedance $Z_S$ of the power-receiving side seen from the power source 111 is represented by the real impedance $Z_{2r}$ of the load 125 on the power-receiving side and the imaginary impedances $jZ_{S1i}$ and $jZ_{S2i}$ of the elements 115 and 123, and does not contain the coupling coefficient k. Since the real impedance $Z_{2r}$ and the imaginary impedances $jZ_{S1i}$ and $jZ_{S2i}$ are independent of the coupling coefficient k, the impedance $Z_S$ is also independent of the coupling coefficient k. That is, when the frequency f is selected (determined) so that Formula (12) is established even when the coupling coefficient changes, the impedance $Z_S$ and the AC voltage $V_S$ ($=Z_S I_1$) does not fluctuate. The establishment of Formula (12) means that the combination of the frequency f, the coupling coefficient k, and the imaginary impedance $Z_{S2i}$ of the element 123 satisfies Formula (13). That is, whether Formula (12) is established has nothing to do with the impedance of the element of the power transmitter 101. In addition, the real part of the impedance $Z_S$ is represented only by the impedance of the load 125 and the self-inductances of the power-transmitting coil 113 and the power-receiving coil 121, and thus is not influenced by the impedances of the elements 115 and 123.

Figure 2:
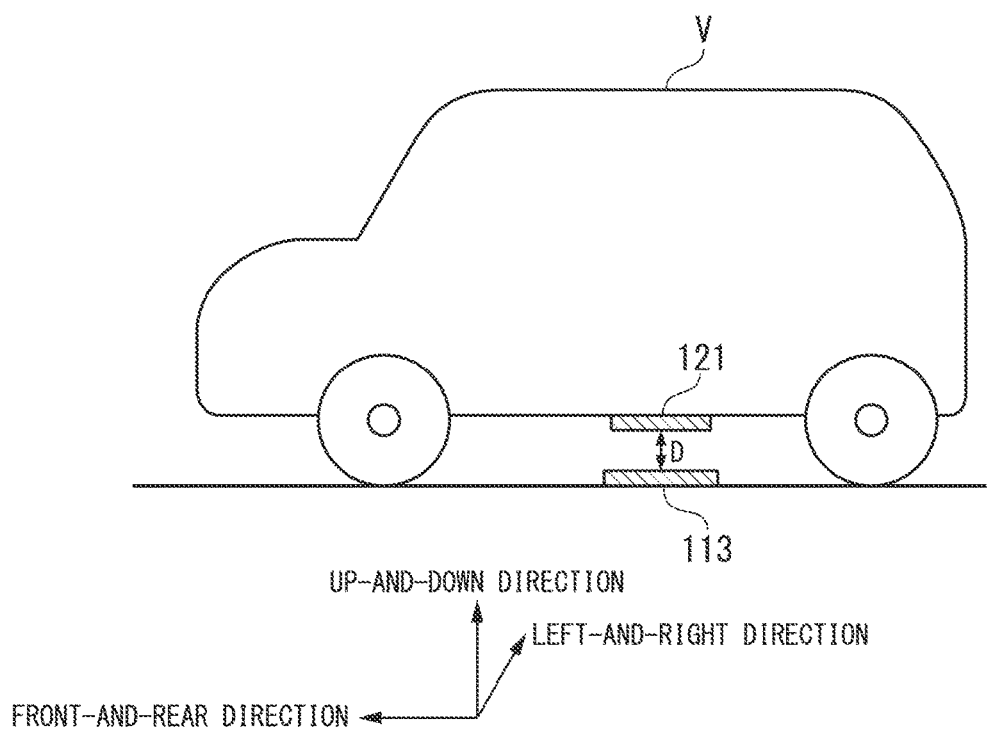
FIG. 2 is a diagram showing an installation example of a power-transmitting coil and a power-receiving coil of the wireless power supply system according to the first embodiment of the present disclosure.

As a situation where the coupling coefficient k changes, for example, when a relative positional relationship between the power-transmitting coil 113 and the power-receiving coil 121 (positional relationship in a front-and-rear direction which is the traveling direction of a vehicle V and in a left-and-right direction which is the rotation direction (turning direction) of the vehicle V in FIG. 2) changes, the coupling coefficient k changes. In addition, when a distance D between the power-transmitting coil 113 and the power-receiving coil 121 (gap distance in an up-and-down direction in FIG. 2) changes, the coupling coefficient k changes. Further, when the direction or inclination of the power-receiving coil 121 with respect to the power-transmitting coil 113 changes, the coupling coefficient k changes. In these cases, a frequency is selected so that Formula (13) is established at a coupling coefficient after the change. Thereby, the impedance $Z_S$ is not influenced by the coupling coefficient after the change, and thus it is possible to suppress a fluctuation in the AC voltage $V_S$. Hereinafter, positional misalignment is defined as follows: the power-transmitting coil 113 or the power-receiving coil 121 deviates from a desired position; or the direction or inclination of the power-receiving coil 121 with respect to the power-transmitting coil 113 deviates from a desired direction or inclination, in at least one direction of the three directions (front-and-rear direction, left-and-right direction, and up-and-down direction).

The meaning that Formula (12) is established is not strictly limited to the establishment of an equal sign relationship in Formula (12). For example, when an error range is determined in advance on the basis of a measurement error, a control error, an allowable fluctuation range of $V_S$ specified in advance, or the like, and the difference between the ratio of $I_2$ to $I_1$ and the square root of the ratio of $L_1$ to $L_2$ is included in the error range, Formula (12) can be regarded as being established. Alternatively, when the difference is included in the error range, the impedance $Z_S$ can be regarded as being independent of the coupling coefficient k. In addition, the inductances $L_1$ and $L_2$ of the power-transmitting coil 113 and the power-receiving coil 121 may change depending on the relative positional relationship between the power-transmitting coil and the power-receiving coil. For this reason, a deviation occurs between initial values $L_1$ and $L_2$ measured in advance before the supply of power and actual values $L_{1r}$ and $L_{2r}$ during the supply of power. For this reason, when a wireless power supply system is designed using the initial values $L_1$ and $L_2$ so that the relational formula of Formula (12) is satisfied, an error ε occurs as in Formula (17), in the relationship between the actual values $L_{1r}$ and $L_{2r}$ during the supply of power and coil currents. Meanwhile, a case where change in the inductances $L_1$ and $L_2$ of the power-transmitting coil 113 and the power-receiving coil 121 has been taken up, but the current $I_1$ and $I_2$ may change when the impedance $jZ_{S2i}$ of the element 123 changes, and thus Formula (17) is established.

$$\left|\frac{I_2}{I_1}\right| = \sqrt{\frac{L_1}{L_2}} = (1+\varepsilon)\sqrt{\frac{L_{1r}}{L_{2r}}} \quad \text{Formula (17)}$$

In this case, the actual values during the supply of power, the impedance $Z_1$ of the power-receiving side seen from the power-transmitting coil 113 is represented by Formula (18), and the impedance $Z_S$ of the power-receiving side seen from the power source 111 is represented by Formula (19). From Formula (19), even when the error ε occurs, the impedance $Z_S$ is independent of the coupling coefficient k.

$$Z_1 = \qquad\qquad\qquad\text{Formula (18)}$$
$$(1+\varepsilon)^2 \frac{L_{1r}}{L_{2r}} Z_{2r} - j\frac{L_{1r}}{L_{2r}}((1+\varepsilon)^2 Z_{S2i} + ((1+\varepsilon)^2 - 1)\omega L_{2r})$$

$$Z_S = (1+\varepsilon)^2 \frac{L_{1r}}{L_{2r}} Z_{2r} + \qquad\qquad\text{Formula (19)}$$
$$j\frac{L_{1r}}{L_{2r}}\left(\frac{L_{2r}}{L_{1r}} Z_{S1i} - (1+\varepsilon)^2 Z_{S2i} - ((1+\varepsilon)^2 - 1)\omega L_{2r}\right)$$

The fact that the impedance $Z_S$ is independent of the coupling coefficient k and that the AC voltage $V_S$ from the power source 111 is not likely to fluctuate means that the voltage on the power-transmission side (for example, voltage $V_1$ between both ends of the power-transmitting coil 113) having a correlation with the AC voltage $V_S$ is not like to fluctuate likewise. In addition, when the power source 111 is constituted by an inverter circuit, the input DC voltage and the output AC voltage of the inverter circuit operate in conjunction with each other. Therefore, the fact that the output AC voltage $V_S$ is not likely to fluctuate means that the input DC voltage is not likely to fluctuate likewise. When the power conversion circuit that outputs this DC voltage includes a chopper circuit, the output terminal of the power conversion circuit includes a capacitor, but a fluctuation in the DC voltage from the power conversion circuit is suppressed, thereby allowing the withstand voltage of this capacitor to be reduced. Therefore, it is possible to reduce the size of the capacitor, and to reduce the size of the power transmitter 101.

Further in Formula (16), when the imaginary impedance $Z_{S1i}$ satisfies Formula (20), the imaginary part of Formula (16) is canceled, and the impedance $Z_S$ has only a real part as in Formula (21). In this case, the power factor of the power source 111 is 100%. On the other hand, the value of the imaginary impedance $Z_{S1i}$ is shifted from the value of Formula (20), and thus the power factor can be set to a desired value without the impedance $Z_S$ depending on the coupling coefficient k.

$$Z_{S1i} = \frac{L_1}{L_2} Z_{S2i} \qquad\qquad\text{Formula (20)}$$

$$Z_S = \frac{L_1}{L_2} Z_{2r} \qquad\qquad\text{Formula (21)}$$

Figure 3:
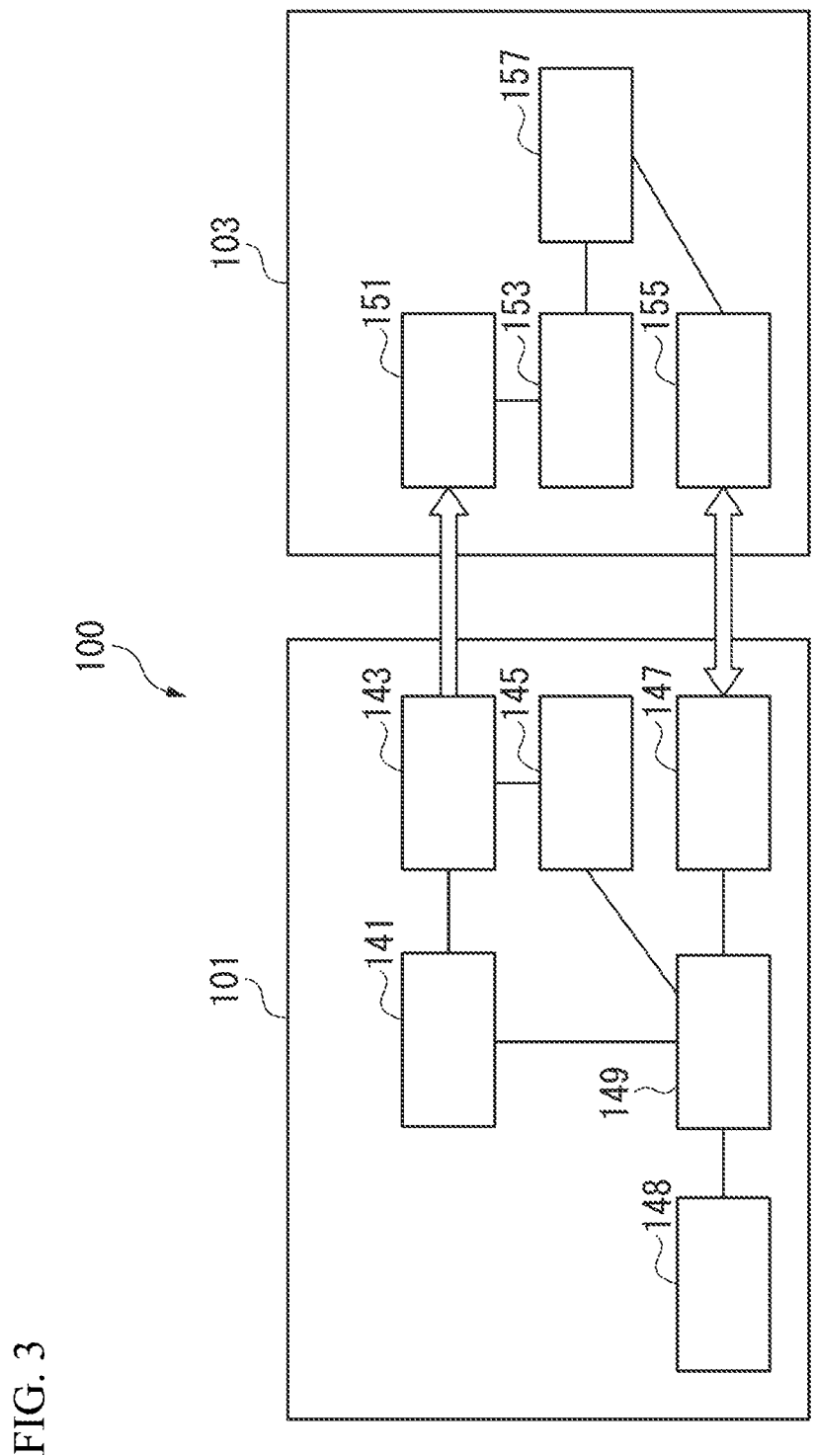
FIG. 3 is a functional block diagram of the wireless power supply system according to the first embodiment of the present disclosure.

Subsequently, reference will be made to FIG. 3 to describe a specific control method of how to change a frequency when the coupling coefficient between the coils changes. FIG. 3 is a functional block diagram of the wireless power supply system according to the first embodiment of the present disclosure.

First, the functional blocks of the power transmitter 101 will be described. The power transmitter 101 includes an AC power output portion 141, a power transmission portion 143, a power-transmission-side detector 145, a power-transmission-side communication portion 147, a storage portion 148, and a power-transmission-side controller 149. The AC power output portion 141 is coupled to the power transmission portion 143, the power transmission portion 143 is coupled to the power-transmission-side detector 145, and the power-transmission-side controller 149 is coupled to the AC power output portion 141, the power-transmission-side detector 145, the power-transmission-side communication portion 147 and the storage portion 148. Meanwhile, the AC power output portion 141 can also be provided outside of the power transmitter 101. In addition, the function of each functional block is realized by hardware. Specifically, the function of the power transmission portion 143 can be realized by a power-transmission device, the function of the power-transmission-side detector 145 can be realized by a power-transmission-side detection device, the function of the power-transmission-side communication portion 147 can be realized by a power-transmission-side communication device, the function of the storage portion 148 can be realized by a memory, and the function of the power-transmission-side controller 149 can be realized by a power-transmission-side control device.

The AC power output portion 141 is equivalent to the power source 111 of FIG. 1, and outputs AC power. In addition, the power transmission portion 143 is equivalent to the power-transmitting coil 113 and the element 115 of FIG. 1, and sends electric power to a power receiving portion 151 of the power receiver 103 described later.

The power-transmission-side detector 145 is a current sensor that detects the current $I_1$ flowing through the power-transmitting coil 113, as a value indicating the power-transmission situation of the power transmission portion 143, and sends data of the detected current to the power-transmission-side controller 149. An example of the current sensor capable of being used includes a sensor that measures a magnetic field, generated in the vicinity of a power cable through which a current passes, on the basis of a Hall effect, or a sensor that has a resistor inserted into a power cable through which a current passes and measures a potential drop occurring in this resistor.

The power-transmission-side communication portion 147 performs radio communication with a power-receiving-side communication portion 155 described later. A system of communication between the power-transmission-side communication portion 147 and the power-receiving-side communication portion 155 is, for example, radio communication using radio waves of ZigBee (Registered Trademark), Bluetooth (Registered Trademark) or the like, or optical communication using an optical signal. In a case of the communication system using radio waves, the power-transmission-side communication portion 147 includes an antenna. In a case of the communication system using an optical signal, the power-transmission-side communication portion 147 includes a light emitting element or a light receiving element for communication.

The storage portion 148 stores various information such as information relating to the coupling coefficient or the impedance (value such as $L_1$ or $L_2$) of the element, a program which describes each function of the power-transmission-side controller 149 described later, and the like, and is constituted by a volatile recording medium such as a random access memory (RAM) or a non-volatile recording medium such as a read only memory (ROM). The information relating to the coupling coefficient refers to, for example, information required for specifying the coupling coefficient between the power-transmitting coil 113 and the power-receiving coil 121, or information of a combination of the frequency f with the coupling coefficient k when Formula (12) is satisfied.

The power-transmission-side controller 149 controls and manages each functional block of the power transmitter 101, and the entirety of the power transmitter 101. The power-transmission-side controller 149 is constituted by, for example, any suitable processor such as a central processing portion (CPU), or a dedicated processor (for example, digital signal processor (DSP)) specialized for each process. Specific processes which are performed by the power-transmission-side controller 149 will be described later.

Next, the functional blocks of the power receiver 103 will be described. The power receiver 103 includes a power receiving portion 151, a power-receiving-side detector 153, a power-receiving-side communication portion 155, and a power-receiving-side controller 157. The power receiving portion 151 is coupled to the power-receiving-side detector 153, and the power-receiving-side detector 153 and the power-receiving-side communication portion 155 are coupled to the power-receiving-side controller 157. In addition, the function of each functional block is realized by hardware. Specifically, the function of the power receiving portion 151 can be realized by a power receiving device, the function of the power-receiving-side detector 153 can be realized by a power-receiving side detection device, the function of the power-receiving-side communication portion 155 can be realized by a power-receiving-side communication device, and the function of the power-receiving-side controller 157 can be realized by a power-receiving-side control device. As is the case with the power transmitter 101, the power receiver 103 also includes a storage portion that stores a program which describes each function of the power-receiving-side controller 157, and the like, but the storage portion is not shown in the drawing.

The power receiving portion 151 is equivalent to the power-receiving coil 121 and the element 123 of FIG. 1, receives electric power transmitted from the power transmission portion 143, and supplies the electric power to the load 125.

The power-receiving-side detector 153 is a current sensor that detects the current $I_2$ flowing through the power-receiving coil 121, as a value indicating the power-receiving situation of the power receiving portion 151, and sends data of the detected current to the power-receiving-side controller 157. An example of the current sensor capable of being used includes a sensor that measures a magnetic field, generated in the vicinity of a power cable through which a current passes, on the basis of a Hall effect, or a sensor that has a resistor inserted into a power cable through which a current passes and measures a potential drop occurring in this resistor.

The power-receiving-side communication portion 155 performs radio communication with the power-transmission-side communication portion 147. In a case of the communication system using radio waves, the power-receiving-side communication portion 155 includes an antenna. In a case where the communication system using an optical signal, the power-receiving-side communication portion 155 includes a light emitting element or a light receiving element for communication.

The power-receiving-side controller 157 controls and manages each functional block of the power receiver 103, and the entirety of the power receiver 103. The power-receiving-side controller 157 is constituted by, for example, any processor such as a CPU or a DSP. Specific processes which are performed by the power-receiving-side controller 157 will be described later.

Subsequently, a description will be given of specific control contents of the power-transmission-side controller 149 and the power-receiving-side controller 157 when a coupling coefficient changes due to positional misalignment. Hereinafter, a coupling coefficient when there is no positional misalignment is denoted by $k_1$, and a frequency satisfying Formula (12) in that case is denoted by $f_1$. The storage portion 148 stores these values in association with each other.

On the assumption that the positional misalignment does not occur, the power-transmission-side controller 149 controls the AC power output portion 141 so as to output AC power of the frequency $f_1$ equivalent to the absence of the positional misalignment. The power transmission portion 143 sends this AC power to the power receiving portion 151. In addition, the power-transmission-side detector 145 detects the current $I_1$ flowing through the power-transmitting coil 113, and sends its data to the power-transmission-side controller 149. On the other hand, the power-receiving-side detector 153 detects the current $I_2$ flowing through the power-receiving coil 121, and sends its data to the power-receiving-side controller 157. The power-receiving-side controller 157 controls the power-receiving-side communication portion 155 so as to transmit the received current data to the power transmitter 101.

Then, the power-transmission-side communication portion 147 receives current data from the power-receiving-side communication portion 155, and sends the current data to the power-transmission-side controller 149. The power-transmission-side controller 149 reads out the values of $L_1$ and $L_2$ stored in the storage portion 148, and determines whether Formula (12) is established, from the read-out values of $L_1$ and $L_2$ and the received data of $I_1$ and $I_2$.

When Formula (12) is established, the power-transmission-side controller 149 determines that the power-transmitting coil 113 and the power-receiving coil 121 have a desired positional relationship, and that there is no positional misalignment therebetween. The power-transmission-side controller 149 controls the AC power output portion 141 so as to continue to output the AC power of the frequency $f_1$ without changing a frequency.

When Formula (12) is not established, the power-transmission-side controller 149 determines that the relative positional relationship between the power-transmitting coil 113 and the power-receiving coil 121 deviates from a desired position. Since the currents flowing through the coils 113 and 121 change due to the positional misalignment, the power-transmission-side controller 149 calculates the amount of change a (a is a value larger or smaller than 1) in the currents from $I_1$ and $I_2$ which are detection values and $L_1$ and $L_2$ which are storage values (see Formula (22)).

$$\alpha = \left|\frac{I_2}{I_1}\right| \div \sqrt{\frac{L_1}{L_2}} \qquad \text{Formula (22)}$$

When the impedances of the element and the load are constant in the right side of Formula (11), a parameter which changes due to the positional misalignment is only the coupling coefficient. That is, since the amount of change a corresponds to the amount of change in the coupling coefficient, a coupling coefficient $k_2$ after the positional misalignment is determined to a value represented by Formula (23).

$$k_2 = \alpha k_1 \qquad \text{Formula (23)}$$

Thus, the power-transmission-side controller 149 reads out the value of the coupling coefficient $k_1$ which is stored in the storage portion 148, determines a coupling coefficient $k_2$ after the positional misalignment by Formula (23), and calculates a frequency $f_2$ satisfying Formula (12) at the coupling coefficient $k_2$, from Formula (13). The power-transmission-side controller 149 controls the AC power output portion 141 so as to output the AC power of this frequency $f_2$.

As shown above, an example of the specific control method of the frequency change has been described. Hereinafter, as a modification example, a method of changing a frequency without using the power-transmission-side detector 145 will be described. Functional block diagrams in this case are the same as those in FIG. 3, except for the power-transmission-side detector 145 being omitted. Hereinafter, a description will be given with a focus on that different from the above. The functions of the functional blocks 141, 143, 147, 151, and 155 are the same as those described above, and thus the description will not be repeated.

The storage portion 148 stores a relationship between the coupling coefficient and power reception in the power receiver 103, as information relating to the coupling coefficient. This relationship is, for example, a relationship between the coupling coefficient and power (supplied power) supplied to the load 125 when the AC power output portion 141 outputs constant electric power at a predetermined frequency (since a frequency is fixed when the coupling coefficient is determined). Hereinafter, information relating to the coupling coefficient stored in the storage portion 148 is a relationship between the power reception and the coupling coefficient, but there is no limitation to such an aspect. As the information relating to the coupling coefficient, a parameter having a correlation with the coupling coefficient can be arbitrarily used. The parameter having a correlation with the coupling coefficient is, for example, the current $I_2$ of the power-receiving coil 121.

The power-receiving-side detector 153 is a voltage sensor and a current sensor that detect a voltage which is applied to the load 125 and a current which is input to the load 125, as a power-receiving situation. Meanwhile, a detection location is not limited load 125, and the power-receiving-side detector 153 may measure a voltage and a current relating to the element 123. In addition, a detection target is not limited to the voltage and the current, and the detection target may be a power. In this case, the power-receiving-side detector 153 is a power sensor. An example of the voltage sensor includes a sensor that divides a voltage using a resistor and converts the voltage into a digital value using an AD converter. In addition, an example of the power sensor includes a sensor that measures a voltage and a current using the voltage sensor and the current sensor, and temporally averages a value obtained by multiplying the voltage and the current together to determine electric power.

When the power transmitter 101 outputs the AC power of the frequency $f_1$, the power receiving portion 151 receives this electric power, and the power-receiving-side detector 153 detects a voltage and a current relating to the load 125 and sends its data to the power-receiving-side controller 157. The power-receiving-side controller 157 calculates a power value which is charged (consumed) in the load 125 from the received data. The power-receiving-side controller 157 controls the power-receiving-side communication portion 155 so as to transmit this power value data to the power transmitter 101.

The power-transmission-side communication portion 147 receives the power value data from the power-receiving-side communication portion 155. The power-transmission-side controller 149 reads out the relationship between the power reception and the coupling coefficient which are stored in the storage portion 148, and determines whether the read-out power value corresponding to the coupling coefficient $k_1$ and the received power value data are coincident with each other. Meanwhile, the wording "coincident with each other" is not limited strictly to the establishment of the equality, and the power-transmission-side controller 149 can also regard the read-out power value and the received power value as being coincident with each other insofar as the difference therebetween is in an error range which is determined in advance.

When these power values are coincident with each other, the power-transmission-side controller 149 determines that the power-transmitting coil 113 and the power-receiving coil 121 have a desired positional relationship, and that there is no positional misalignment therebetween. The power-transmission-side controller 149 controls the AC power output portion 141 so as to continue to output the AC power of the frequency $f_1$ without changing the frequency.

When these power values are not coincident with each other, the power-transmission-side controller 149 determines that the relative positional relationship between the power-transmitting coil 113 and the power-receiving coil 121 deviates from a desired position, and specifies the coupling coefficient $k_2$ corresponding to the received power value data from the relationship (for example, relationship between the power reception and the coupling coefficient) stored in the storage portion 148. The power-transmission-side controller 149 calculates a frequency $f_2$ satisfying Formula (12) at the coupling coefficient $k_2$, and controls the AC power output portion 141 so as to output the AC power of this frequency $f_2$.

As described above, in the wireless power supply system 100 of the present embodiment, when the coupling coefficient k changes, the frequency f and the imaginary impedance $jZ_{S2i}$ of the element 123 are determined so that the impedance $Z_S$ of the power-receiving side seen from the power source 111 is independent of the coupling coefficient k, on the basis of satisfying the Formula (12). That is, in the present embodiment, the wireless power supply system 100 satisfies Formula (12), thereby the impedance $Z_S$ is represented by the real impedance $Z_{2r}$ and the imaginary impedances $jZ_{S1i}$ and $jZ_{S2i}$ of the load 125, and is independent of the coupling coefficient k. For this reason, when the coupling coefficient k changes due to a positional misalignment between the power-transmitting coil 113 and the power-receiving coil 121 or a change in the distance between the coils, the power-transmission-side controller 149 selects the frequency f so that Formula (12) is established. That is, the power-transmission-side controller 149 is configured to perform the following. When the coupling coefficient k changes, the power-transmission-side controller 149 regulates the frequency f so that the impedance $Z_S$ of the power-receiving side seen from the power source 111 is independent of the coupling coefficient k. By changing the frequency f in this manner, a case does not occur in which the impedance $Z_S$ changes due to a change in the coupling coefficient k, and thus it is possible to suppress a fluctuation in the impedance $Z_S$. It is possible to suppress a fluctuation in the AC voltage $V_S$ to such an extent that the impedance $Z_S$ is not likely to fluctuate.

In the present embodiment, the element 115 of the power transmitter 101 and the element 123 of the power receiver 103 can be set so as to satisfying Formula (20). In this case, the impedance $Z_S$ does not have an imaginary part, and not only the impedance $Z_S$ of the power-receiving side seen from the power source 111 is independent of the coupling coefficient, but also the power factor of the power source 111 is 100%. Thus, it is possible to maximize a power-transmission efficiency in the power source 111. In this case, since the impedance of the power-transmission side seen from the power-receiving side is also determined to pure resistance (resistance having none of inductance and capacitance), electric power can be transmitted from the load 125 to the power source 111 with the same efficiency as the efficiency of power transmission from the power source 111 to the load 125. That is, it is possible to perform bidirectional power transmission.

As in the present embodiment, designing the wireless power supply system 100 so that Formula (12) is established has an advantage when mutual compatibility between a plurality of power receivers or between a plurality of power transmitters is secured. For example, a description will be given of a case where the power transmitter 101 and the power receiver 103 where Formula (12) is established are designed, and a power receiver (second power receiver) for supplying electric power to a load (second load) of impedance $Z_{2ra}$ different from the load 125 is required to be designed (the circuit configuration of the second power receiver is the same as that of the power receiver 103, and only the element impedance of the second power receiver is different from that of the power receiver 103). In this case, $\beta = Z_{2ra}/Z_{2r}$ is determined, and self-inductance $L_{2a}$ of a power-receiving coil (a second power-receiving coil corresponding to the power-receiving coil 121) of the second power receiver and imaginary impedance $jZ_{S2ia}$ of an element (second element corresponding to the element 123) are determined so as to satisfy Formula (24) and Formula (25).

$$L_{2a} = \beta L_2 \qquad \text{Formula (24)}$$

$$Z_{S2ia} = \beta Z_{S2i} \qquad \text{Formula (25)}$$

In this case, when the power transmitter 101 and the second power receiver are combined, the impedance $Z_S$ of the power-receiving side seen from the power source 111 is determined to a value represented by Formula (16). That is, the second power receiver is realized so that Formula (24) and Formula (25) are established, and thus the impedance of the power-receiving side seen from the power source 111 can be kept constant without changing the power transmitter 101. Thereby, even when the impedance of the load changes, a wireless power supply system in which a voltage on the power-transmission side is likely to fluctuate can be constructed through a simple design change.

Similarly, even when the same electric power as that in a case of the power source 111 is required to be supplied to the load 125 from a power source (second power source) that outputs a voltage $V_{Sa}$ which is different from the power source 111, a power transmitter (hereinafter, second power transmitter) to which the voltage $V_{Sa}$ is supplied can be configured through a simple design change (the circuit configuration of the second power transmitter is the same as that of the power transmitter 101, and only the element impedance of the second power transmitter is different from that of the power transmitter 101). Specifically, in order for the second power source to output the same power P as that of the power source 111, the impedance $Z_{Sa}$ of the power-receiving side seen from the second power source is required to satisfy Formula (26).

$$Z_{Sa} = \frac{V_{Sa}^2}{P} = \frac{V_{Sa}^2}{V_S^2} Z_S \qquad \text{Formula (26)}$$

When the relation of $\gamma = (V_{Sa}/V_S)^2$ is established, self-inductance $L_{1a}$ of a power-transmitting coil (second power-transmitting coil corresponding to the power-transmitting coil 113) of the second power transmitter and imaginary impedance $jZ_{S1ia}$ of an element (third element corresponding to the element 115) satisfy Formula (27) and Formula (28), and thus Formula (26) is satisfied.

$$L_{1a} = \gamma L_1 \qquad \text{Formula (27)}$$

$$Z_{S1ia} = \gamma Z_{S1i} \qquad \text{Formula (28)}$$

That is, the second power transmitter is realized so that Formula (27) and Formula (28) are established, and thus a constant voltage can be supplied to the load 125 without changing the power receiver 103. Thereby, even when the voltage of the power source changes, a wireless power supply system in which a voltage on the power-transmission side is likely to fluctuate can be constructed through a simple design change.

Second Embodiment

In the first embodiment, a description has been given of a case where the element 115 having imaginary impedance is coupled in series to the power-transmitting coil 113, and the element 123 having imaginary impedance is coupled in series to the power-receiving coil 121. In a second embodiment, a description will be given of a case where elements having imaginary impedance are coupled in parallel to a power-transmitting coil and a power-receiving coil.

A wireless power supply system 200 according to the second embodiment includes a power transmitter 201 and a power receiver 203. The power transmitter 201 includes a power-transmitting coil 213 to which AC power is input from a power source 211, an element (power-transmission-side series element) 215, and an element (power-transmission-side parallel element) 217. The power receiver 203 includes a power-receiving coil 221, an element (power-receiving-side series element) 223, and an element (power-receiving-side parallel element) 227. A load 225 is coupled in series to the element 223. These components 211, 213, 215, 221, 223, and 225 are the same as the components 111, 113, 115, 121, 123, and 125, respectively, of the power transmitter 101 and the power receiver 103 according to the first embodiment, and thus the description will not be repeated. The following description shows that the impedance $Z_S$ (impedance which does not include the power source 211) of the power-receiving side seen from the power source 211 is independent of the coupling coefficient in the circuit of FIG. 4. Meanwhile, as shown in FIG. 5, the wireless power supply system 200 includes an AC power output portion 241, a power transmission portion 243, a power-transmission-side detector 245, a power-transmission-side communication portion 247, a storage portion 248, a power-transmission-side controller 249, a power receiving portion 251, a power-receiving-side detector 253, a power-receiving-side communication portion 255 and a power-receiving-side controller 257. The functions of the respective function portions are the same as the functions of the function portions according to the first embodiment which correspond thereto, and thus the description will not be repeated. In addition, in a change control method of a frequency, the same method as that in the first embodiment can also be used.

The element 217 is coupled in parallel to the power-transmitting coil 213 and coupled to the power-transmitting coil side rather than the element 215, and has imaginary impedance $jZ_{P1i}$. That is, the element 217 is coupled in parallel to the power-transmitting coil 213 at a position closer to the power-transmitting coil 213 than the element 215, and has imaginary impedance $jZ_{P1i}$. To express such a coupling relationship in other words, the element 215 is coupled in series to the power-transmitting coil 213 at a position closer to the power source 211 than the element 217. In addition, the element 227 is coupled in parallel to the power-receiving coil 221 and coupled to the power-receiving coil side rather than the element 223, and has imaginary impedance $jZ_{P2i}$. That is, the element 227 is coupled in parallel to the power-receiving coil 221 at a position closer to the power-receiving coil 221 than the element 223, and has imaginary impedance $jZ_{P2i}$. The elements 217 and 227 are constituted, for example, by a reactance element such as an inductor (reactor, coil) or a capacitor, or a plurality of elements of a combination of such elements.

Figure 4:
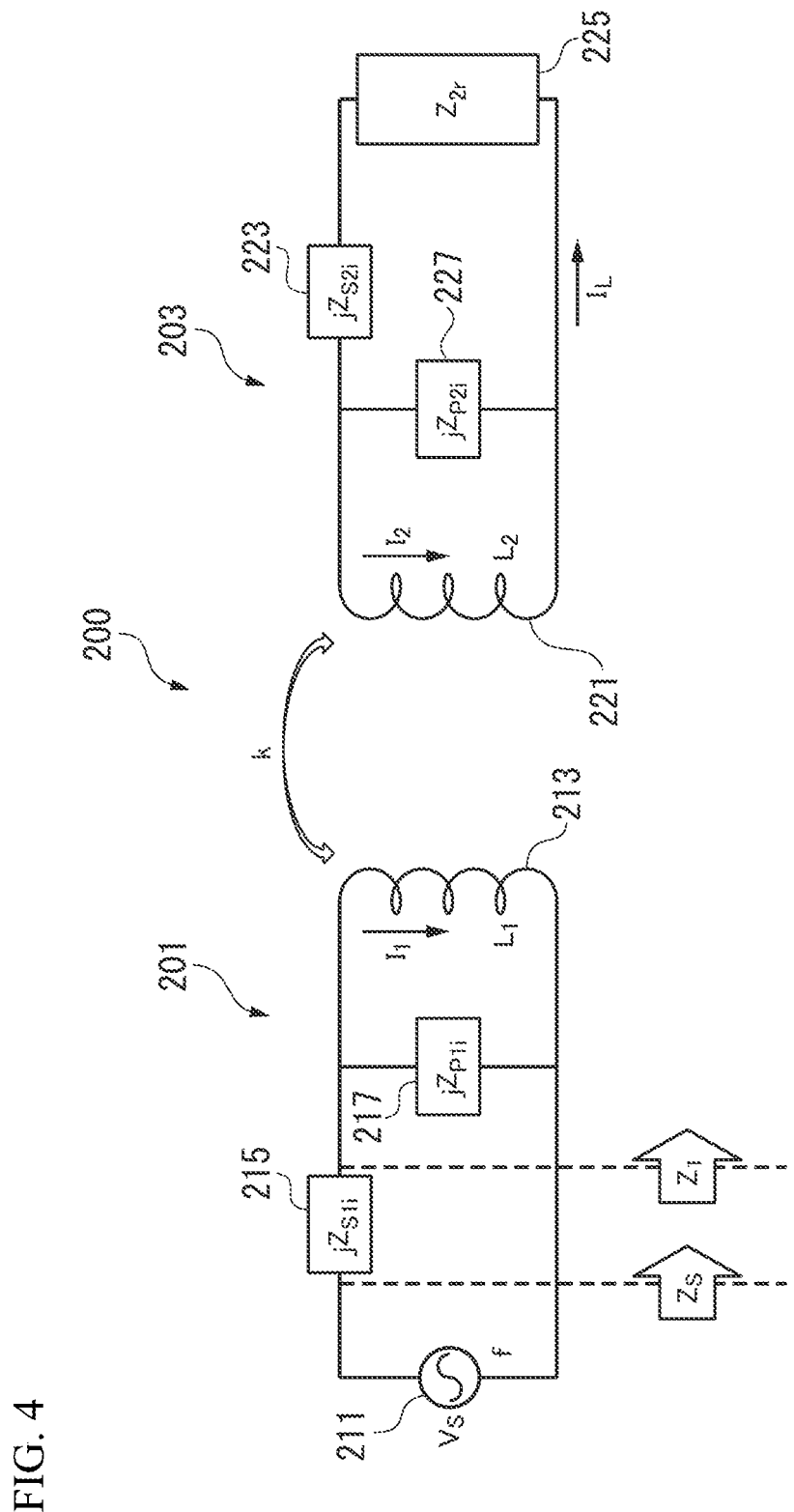
FIG. 4 is a circuit diagram of a wireless power supply system according to a second embodiment of the present disclosure.
Figure 5:
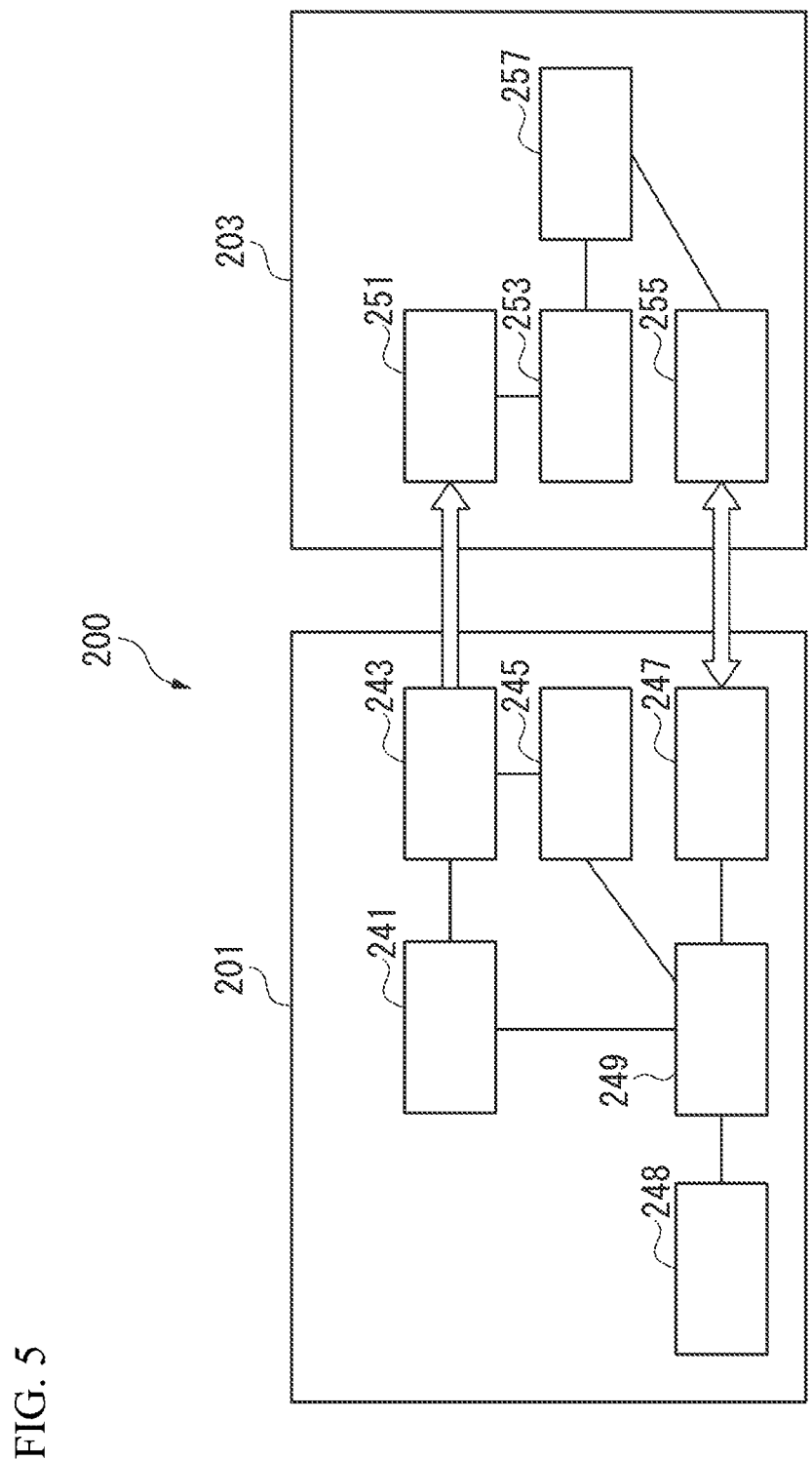
FIG. 5 is a functional block diagram of the wireless power supply system according to the second embodiment of the present disclosure.

When the circuit equation of FIG. 4 is set up, Formula (29) is established.

$$\begin{bmatrix} j\omega L_1 + j\dfrac{Z_{S1i}Z_{P1i}}{Z_{S1i}+Z_{P1i}} & j\omega k\sqrt{L_1 L_2} \\ j\omega k\sqrt{L_1 L_2} & j\omega L_2 + \dfrac{jZ_{P2i}(Z_{2r}+jZ_{S2i})}{Z_{2r}+jZ_{S2i}+jZ_{P2i}} \end{bmatrix}\begin{bmatrix} I_1 \\ I_2 \end{bmatrix} =$$
$$\begin{bmatrix} \dfrac{Z_{p1i}}{Z_{S1i}+Z_{p1i}}V_S \\ 0 \end{bmatrix}$$

Formula (29)

As in the first embodiment, each parameter of the wireless power supply system 200 is determined or controlled so that Formula (12) is established. In this case, the result of determining the impedance $Z_1$ (impedance which includes the element 217) of the power-receiving side seen from the element 217 is determined to a value represented by Formula (30), and this formula does not contain the coupling coefficient k.

$$Z_1 = \dfrac{L_1}{L_2}\dfrac{Z_{P1i}Z_{P2i}(Z_{2r}-jZ_{S2i})}{Z_{P1i}Z_{P2i}+\left(Z_{P1i}-\dfrac{L_1}{L_2}Z_{P2i}\right)(Z_{S2i}+jZ_{2r})}$$

Formula (30)

When the impedance values of the power-transmission-side parallel element 217 and the power-receiving-side parallel element 227 are determined so that Formula (31) is established, Formula (32) is established from Formula (30) and Formula (31).

$$Z_{P1i} = \dfrac{L_1}{L_2}Z_{P2i}$$

Formula (31)

$$Z_1 = \dfrac{L_1}{L_2}(Z_{2r}-jZ_{S2i})$$

Formula (32)

Thus, the impedance $Z_S$ of the power-receiving side seen from the power source 211 is determined to a value represented by Formula (33).

$$Z_S = \dfrac{L_1}{L_2}\left(Z_{2r}+j\left(\dfrac{L_2}{L_1}Z_{S1i}-Z_{S2i}\right)\right)$$

Formula (33)

According to Formula (33), when Formula (12) and Formula (31) are established, the impedance $Z_S$ of the power-receiving side seen from the power source 211 is represented by the real impedance $Z_{2r}$ of the load 225 on the power-receiving side and the imaginary impedances $jZ_{S1i}$ and $jZ_{S2i}$ of the elements 215 and 223. Since the real impedance $Z_{2r}$ of the load 225 and the imaginary impedances $jZ_{S1i}$ and $jZ_{S2i}$ are independent of the coupling coefficient k, the impedance $Z_S$ is also independent of the coupling coefficient k. In addition, a real part of the impedance $Z_S$ is represented only by the impedance of the load 225 and self-inductances of the power-transmitting coil 213 and the power-receiving coil 221, and is not influenced by impedances of the elements 215, 217, 223 and 227.

Further, when the imaginary impedance $Z_{S1i}$ satisfies Formula (34), the imaginary part of Formula (33) is canceled, and the impedance $Z_S$ has only a real part as in Formula (35). In this case, the power factor of the power source 211 is 100%. On the other hand, the value of the imaginary impedance $Z_{S1i}$ is shifted from the value of Formula (34), and thus the power factor can be determined to a desired value without the impedance $Z_S$ depending on the coupling coefficient k.

$$Z_{S1i} = \dfrac{L_1}{L_2}Z_{S2i}$$

Formula (34)

$$Z_S = \dfrac{L_1}{L_2}Z_{2r}$$

Formula (35)

Figure 6:
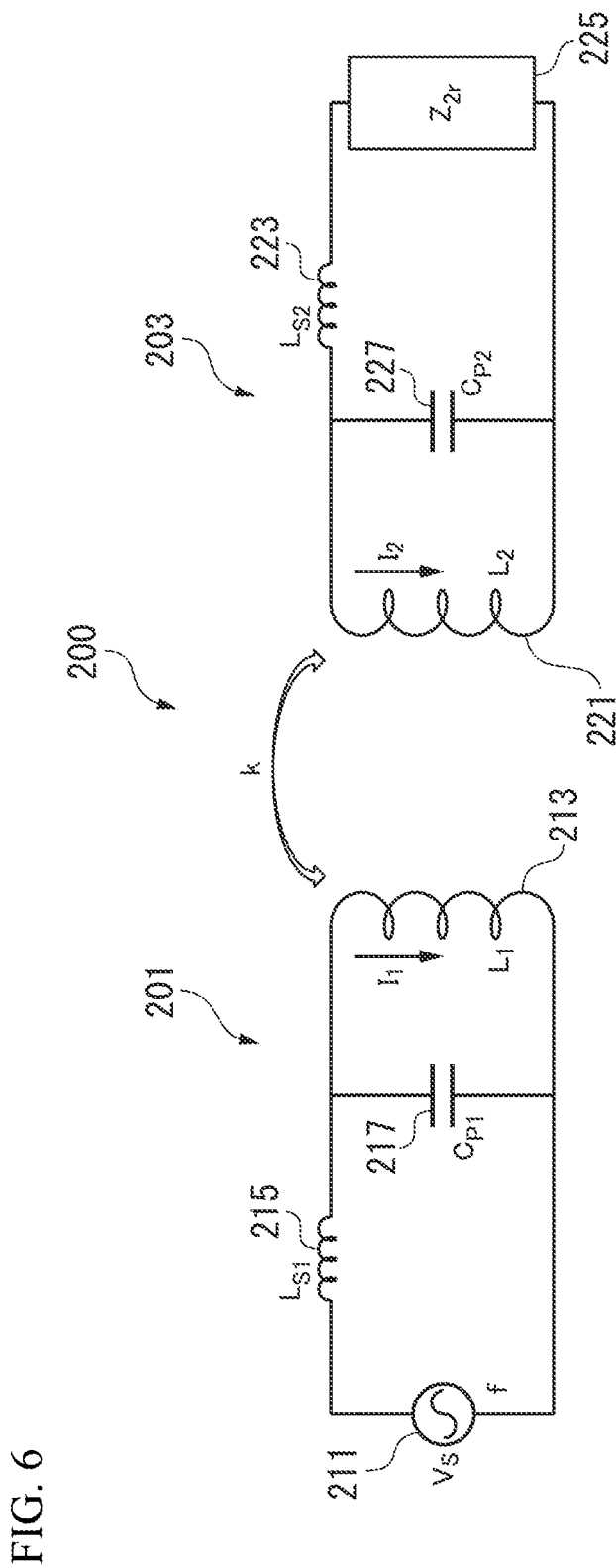
FIG. 6 is a specific circuit diagram of the wireless power supply system according to the second embodiment of the present disclosure.

A description will be given of a case where the circuit of FIG. 4 is constituted by more specific circuit elements. Specifically, as shown in FIG. 6, the elements 215 and 223 are constituted by inductors (having self-inductances of $L_{S1}$ and $L_{S2}$), and the elements 217 and 227 are constituted by capacitors (having capacitances of $C_{P1}$ and $C_{P2}$).

In this case, a relationship between the capacitances of the elements 217 and 227 is represented by Formula (36) from Formula (31). When Formula (12) and Formula (36) are established, the real part of the impedance $Z_S$ of the power-receiving side seen from the power source 211 is independent of the coupling coefficient k.

$$C_{P1} = \dfrac{L_2}{L_1}C_{P2}$$

Formula (36)

In addition, a relationship between the self-inductances of the elements 215 and 223 is represented by Formula (37) from Formula (34). When Formula (12), Formula (36) and Formula (37) are established, the power factor of the power source 211 is 100%.

$$L_{S1} = \dfrac{L_1}{L_2}L_{S2}$$

Formula (37)

A description will be given of a relationship between the coupling coefficient k and the frequency f satisfying Formula (12) in the circuit configuration of FIG. 6. When the ratio of a current $I_2$ to a current $I_1$ is determined from the circuit equation of FIG. 6, the ratio is determined to a value represented by Formula (38).

$$\frac{I_2}{I_1} = \frac{-j\omega k\sqrt{L_1 L_2}}{j\omega L_2 + \dfrac{\dfrac{1}{j\omega C_{P2}}(Z_{2r} + j\omega L_{S2})}{Z_{2r} + j\omega L_{S2} + \dfrac{1}{j\omega C_{P2}}}}$$ Formula (38)

When Formula (38) satisfies Formula (12), Formula (39) is established. Meanwhile, the asterisk "*" in Formula (39) indicates a complex conjugate.

$$k^2 = \frac{\left(j\omega L_2 + \dfrac{\dfrac{1}{j\omega C_{P2}}(Z_{2r} + j\omega L_{S2})}{Z_{2r} + j\omega L_{S2} + \dfrac{1}{j\omega C_{P2}}}\right)\left(j\omega L_2 + \dfrac{\dfrac{1}{j\omega C_{P2}}(Z_{2r} + j\omega L_{S2})}{Z_{2r} + j\omega L_{S2} + \dfrac{1}{j\omega C_{P2}}}\right)^*}{\omega^2 L_2^2}$$ Formula (39)

Figure 7:
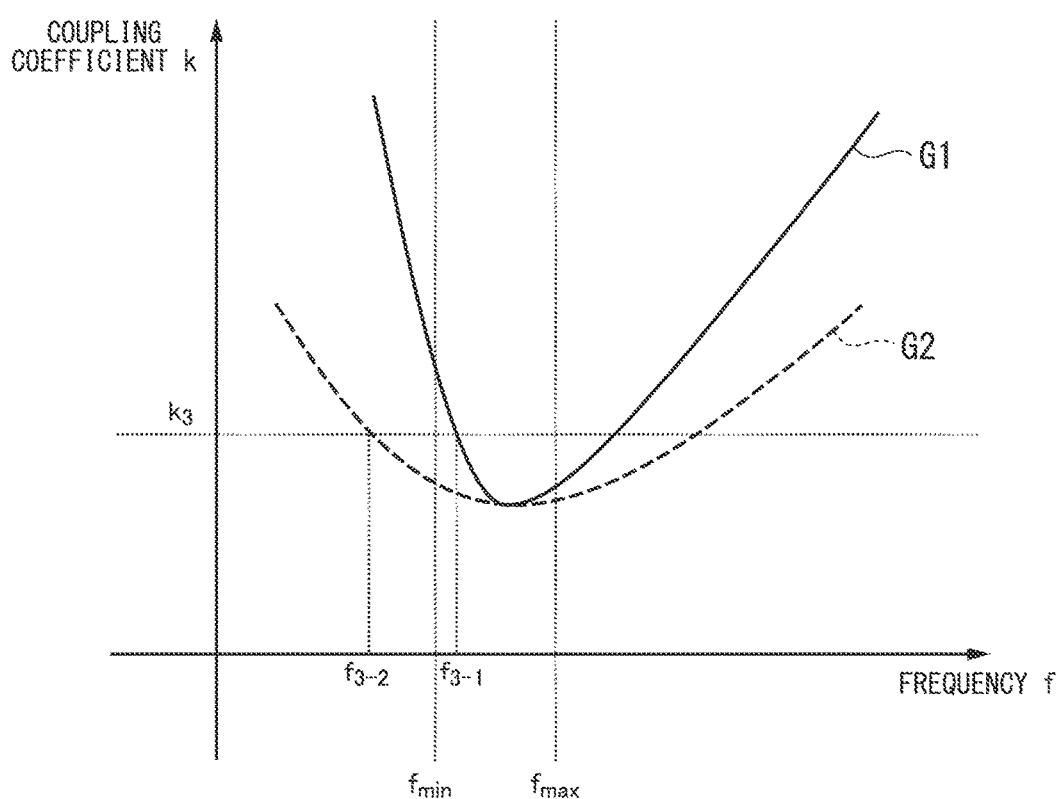
FIG. 7 is a graph showing an example of a relationship between a frequency and a coupling coefficient according to the second embodiment of the present disclosure.

When the impedances of the elements and the load are fixed, the coupling coefficient k is a function of an angular frequency ω (that is, frequency f), and this function is represented by a solid-line graph G1 of FIG. 7. Meanwhile, a broken-line graph G2 of FIG. 7 which is a comparison target indicates a result in a case the element 223 of the power receiver 203 is constituted by only the capacitor rather than the inductor. The element 223 being constituted by the inductor rather than the element 223 being constituted by only the capacitor obtains a result of the magnitude of the inclination of the graph becoming larger, that is, the change range of the coupling coefficient k satisfying Formula (12) becomes larger by changing the frequency f.

A description will be given of a case where, for example, as the restriction of the power source 211 or the entire wireless power supply system 200, the variable range ($f_{min}$ (lower limit)≤f≤$f_{max}$(upper limit)) of the frequency f is determined, and this variable range is determined as in FIG. 7 with respect to the graphs G1 and G2. The variable range is determined by, for example, the upper and lower limits of the frequency range of power capable of being output by the power source 211. When the coupling coefficient becomes a value denoted by $k_3$ of FIG. 7 due to the positional misalignment between the power-transmitting coil and the power-receiving coil, or the like, a frequency $f_{3-1}$ satisfying Formula (12) is included within the variable range in the graph G1. On the other hand, in the graph G2, a frequency $f_{3-2}$ satisfying Formula (12) lies outside of the variable range. That is, when the power-receiving-side series element 223 of the power receiver 203 is constituted by the inductor, a frequency satisfying Formula (12) is more likely to be present within the variable range than when the element is constituted by the capacitor even when the coupling coefficient changes greatly. Thereby, it is possible to change a frequency while suppressing fluctuation in an AC voltage from the power source 211, in response to a change in the coupling coefficient in a wider range.

Figure 8:
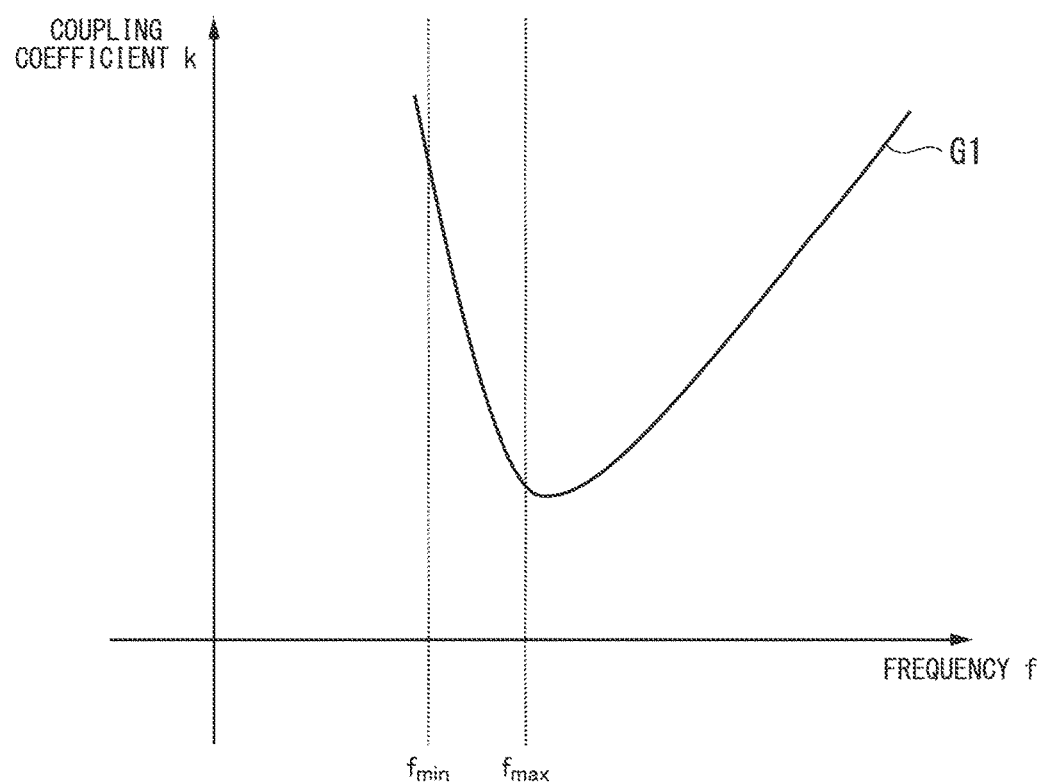
FIG. 8 is a graph showing an example of a relationship between the frequency and the coupling coefficient according to the second embodiment of the present disclosure.

When at least one of the self-inductance $L_{S2}$ of the element 223 (inductor) and the capacitance $C_{P2}$ of the element 227 (capacitor) can be set to any given value, the shape of the graph G1 changes with a change in a setting value. For example, when the value of the self-inductance $L_{S2}$ is selected so that the coupling coefficient monotonically decreases or monotonically increases in the variable range, the change range of the coupling coefficient k becomes larger than when the minimum value of the coupling coefficient is located in the variable range. Particularly, when a relationship between the coupling coefficient k and the frequency f satisfying Formula (12) is asymmetric centering on the minimum value of the coupling coefficient (asymmetric with respect to a line parallel to the axis (vertical axis) of the coupling coefficient of FIG. 8 through this minimum value) as shown in FIG. 8, it is preferable that the variable range of the frequency f is located in a region (in FIG. 8, a monotonically decreasing region, or the left side of the minimum value) having a larger absolute value of an inclination.

When the fluctuation range of the coupling coefficient is present, the impedances of the element 223 and element 227 are determined so that the coupling coefficient is determined to the upper limit $k_{max}$ or the lower limit $k_{min}$ of the fluctuation range when the frequency is the upper limit $f_{max}$ or the lower limit $f_{min}$ of the variable range, as shown in FIGS. 9A through 9D.

Figure 9A:
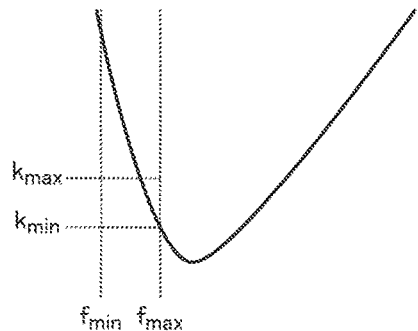
FIG. 9A is a graph showing an example of a relationship between the frequency and the coupling coefficient according to the second embodiment of the present disclosure.
Figure 9B:
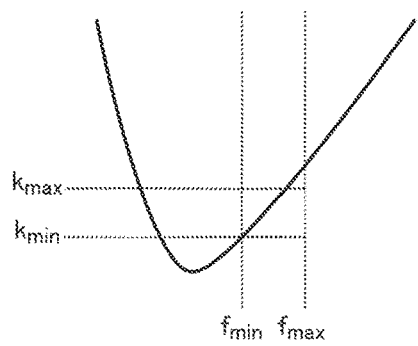
FIG. 9B is a graph showing an example of a relationship between the frequency and the coupling coefficient according to the second embodiment of the present disclosure.

That is, in the wireless power supply system 200 of the present embodiment, the imaginary impedances of the element 223 and element 227 are determined so as to satisfy Formula (12) when the frequency is the upper limit $f_{max}$ or the lower limit $f_{min}$ of the variable range, and the coupling coefficient is the upper limit $k_{max}$ or the lower limit $k_{min}$ of the fluctuation range. In Formula (12), as the self-inductances of the power-transmitting coil 213 and the power-receiving coil 221, any of values in the changing range of the self-inductance which depends on change in the coupling coefficient k within the fluctuation range is used. By making such a determination, it is possible to increase the possibility of the frequency f satisfying Formula (12) being present when the coupling coefficient changes. Meanwhile, FIG. 9A shows a case where the coupling coefficient is determined to the lower limit $k_{min}$ of the fluctuation range when the frequency is the upper limit $f_{max}$ of the variable range. FIG. 9B shows a case where the coupling coefficient is determined to the lower limit $k_{min}$ of the fluctuation range when the frequency is the lower limit $f_{min}$ of the variable range.

Figure 9C:
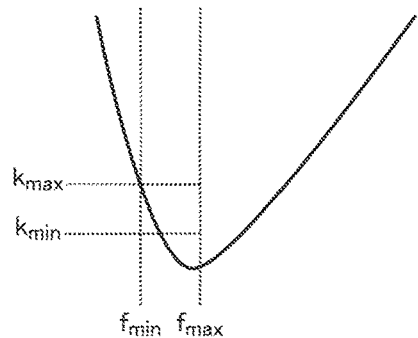
FIG. 9C is a graph showing an example of a relationship between the frequency and the coupling coefficient according to the second embodiment of the present disclosure.
Figure 9D:
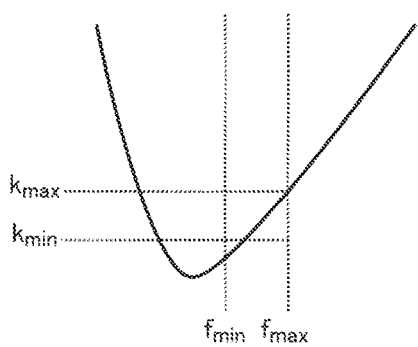
FIG. 9D is a graph showing an example of a relationship between the frequency and the coupling coefficient according to the second embodiment of the present disclosure.

FIG. 9C shows a case where the coupling coefficient is determined to the upper limit $k_{max}$ of the fluctuation range when the frequency is the lower limit $f_{min}$ of the variable range. FIG. 9D shows a case where the coupling coefficient is determined to the upper limit $k_{max}$ of the fluctuation range when the frequency is the upper limit $f_{max}$ of the variable range.

Further, when a relationship between the frequency f and the coupling coefficient k satisfying Formula (12) is determined to a relationship represented by a graph monotonically increasing or monotonically decreasing (for example, graph of FIG. 8 monotonically decreasing) in the variable range of the frequency f, a change control method of a frequency can be performed more easily than the method described in the first embodiment. The method in the first embodiment is a method of determining the coupling coefficient $k_2$ after a change from Formula (23), and calculating the frequency $f_2$ satisfying Formula (12) from Formula (13). On the other hand, hereinafter, a description will be given of a method of determining the frequency $f_2$ without using Formula (13). Specifically, Formula (12) is established at the time of the establishment of α=1 from Formula (20), and thus the power-transmission-side controller 249 performs feedback control so that a is 1. For example, the power-transmission-side controller 249 determines a on the basis of the values of currents $I_1$ and $I_2$ detected by the power-transmission-side detector 245 and the power-receiving-side detector 253, and performs PID control on a difference between α and 1. Since the polynomial of Formula (13) is not required to be solved, it is possible to limit the computational load of the power-transmission-side controller 249.

As described above, in the present embodiment, the frequency f, the coupling coefficient k, and the imaginary impedance of the power-receiving-side series element 223 satisfy Formula (12), and thus the impedance $Z_S$ of the power-receiving side seen from the power source 211 is independent of the coupling coefficient k. In addition, the power-transmission-side parallel element 217 and the power-receiving-side parallel element 227 satisfy Formula (31), and thus the impedance $Z_S$ is represented by the same formula as that in the first embodiment and is not influenced by the impedance values of the elements 217 and 227. When the coupling coefficient k changes due to the positional misalignment between the power-transmitting coil 213 and the power-receiving coil 221 or a change in a distance between the coils, the frequency f can be selected so that Formula (12) is established. That is, the power-transmission-side controller 249 is configured to regulate the frequency f so that the impedance $Z_S$ of the power-receiving side seen from the power source 211 is independent of the coupling coefficient k, when the coupling coefficient k changes. Thereby, by changing the frequency f, a case does not occur in which the impedance $Z_S$ changes due to a change in the coupling coefficient k, and thus it is possible to suppress fluctuation in the impedance $Z_S$. Thus, it is possible to suppress fluctuation in the AC voltage $V_S$ to such an extent that the impedance $Z_S$ is not likely to fluctuate.

In the present embodiment, the power-receiving-side series element 223 can be constituted by the inductor.

When the power receiver 203 includes a power conversion circuit under such a configuration, the power-receiving-side series element 223 plays a role in a harmonic reduction filter, and thus the waveform of an alternating current which is supplied to the load 225 can be brought close to an ideal sine wave.

In the present embodiment, the power-receiving-side series element 223 can be constituted by the inductor, and the power-receiving-side parallel element 227 can be constituted by the capacitor. Thereby, the magnitude of the inclination of the graph indicating a relationship between the frequency f and the coupling coefficient k satisfying Formula (12) can be made larger than when both the power-receiving-side series element 223 and the power-receiving-side parallel element 227 are constituted by the capacitors. Thus, it is possible to correspond to a wider fluctuation range of the coupling coefficient k in a finite variable range of the frequency f.

Although the present disclosure has been described on the basis of the drawings or embodiments, those skilled in the art can perform additions, omissions, substitutions, and other modifications of configurations within the claims of the present application, that is, without departing from the spirit of the present disclosure. The present disclosure is not to be considered as limited by the foregoing description and is only limited by the scope of the appended claims.

Figure 10:
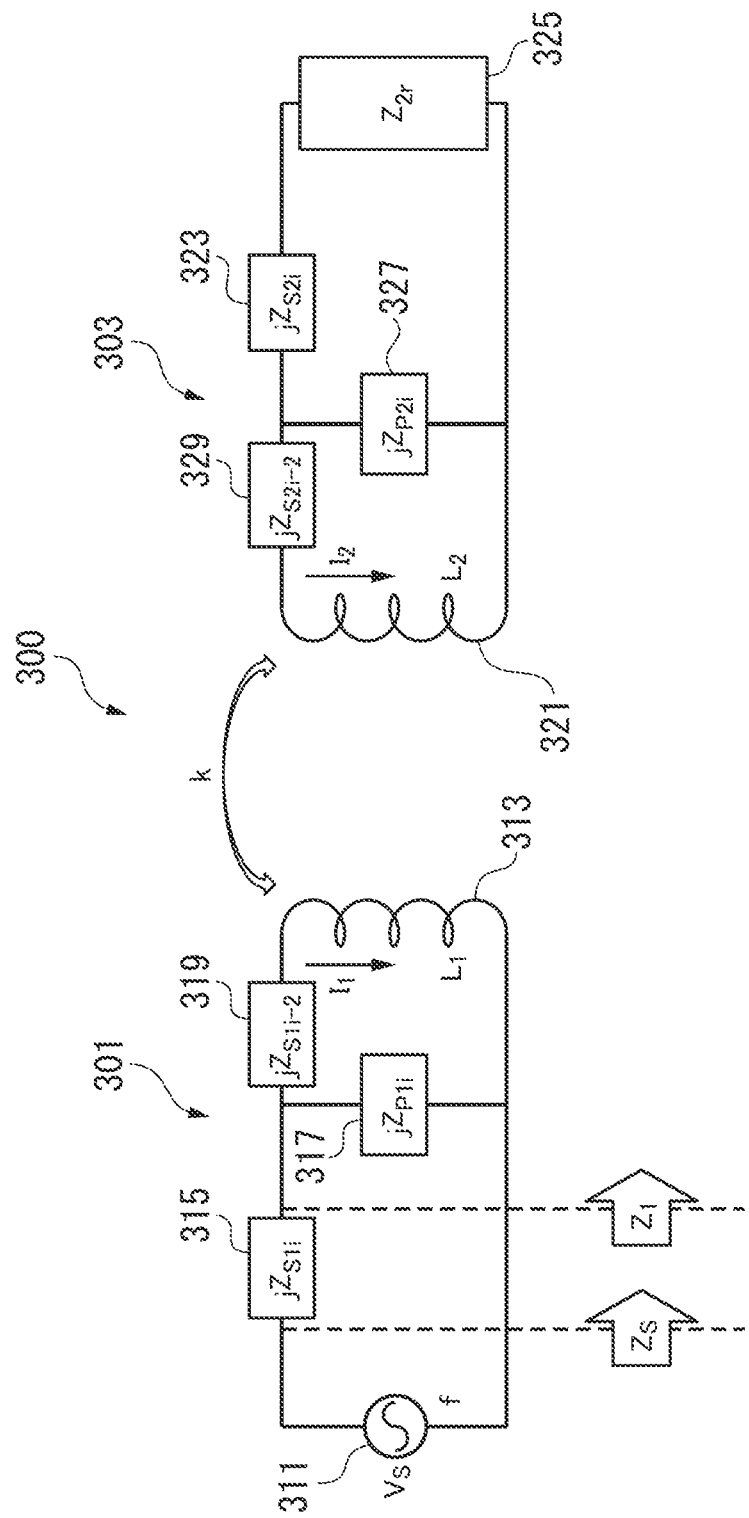
FIG. 10 is a circuit diagram of a wireless power supply system according to a modification example of the present disclosure.

In the embodiments of the present disclosure, the element configurations (FIGS. 1 and 4) of two aspects have been described, but the present disclosure is not limited to these aspects. For example, as shown in FIG. 10, a power transmitter may include an element 319 which is coupled in series to a power-transmitting coil 313 and coupled to the power-transmitting coil side rather than a power-transmission-side parallel element 317, and a power receiver may include an element 329 which is coupled in series to a power-receiving coil 321 and coupled to the power-receiving coil side rather than a power-receiving-side parallel element 327. That is, the element 319 is coupled in series to the power-transmitting coil 313 at a position closer to the power-transmitting coil 313 than the power-transmission-side parallel element 317. The element 329 is coupled in series to the power-receiving coil 321 at a position closer to the power-receiving coil 321 than the power-receiving-side parallel element 327. The elements 319 and 329 include imaginary impedances $jZ_{S1i-2}$ and $jZ_{S2i-2}$, respectively. As in the first and second embodiments, when a circuit equation is solved, and Formula (12), Formula (31) and Formula (40) are established, Formula (33) is established. Thereby, the impedance $Z_S$ is configured so as not to be influenced by the coupling coefficient k (so as to be independent). In the example of the circuit configuration as shown in FIG. 10, each of the elements 315 and 323 is an inductor, and each of the elements 317, 319, 327, and 329 is a capacitor. In a further modification example, a further element (not shown) may be coupled in parallel or series to the power-transmitting coil 313 between the power-transmission-side series element 315 and the power-transmitting coil 313, and a further element (not shown) may be coupled in parallel or series to the power-receiving coil 321 between the power-receiving-side series element 323 and the power-receiving coil 321. Even in this case, the impedance $Z_S$ can be made independent of the coupling coefficient k. Specifically, the element configurations of the power transmitter 301 and the power receiver 303 may be set to be symmetric with respect to each other on the basis of the power-transmitting coil 313 and the power-receiving coil 321 (line-symmetric with respect to a straight line which is located in the middle of the power-transmitting coil 313 and the power-receiving coil 321 of FIG. 10 and is orthogonal to the power-transmission direction of both the coils), and the impedance of the element on the power-transmission side may be $(L_1/L_2)$ times the impedance of the symmetric element on the power-receiving side (see Formula (40)).

$$Z_{S1i-2} = \frac{L_1}{L_2} Z_{S2i-2} \qquad \text{Formula (40)}$$

In the description of the aforementioned embodiment of the present disclosure, a fluctuation in the impedance $Z_{2r}$ of the load is not considered. However, for example, when the load is constituted by a battery, the impedance $Z_{2r}$ of the load (battery) fluctuates depending on the state of charge (SOC) of the battery. In this case, the real part of the impedance $Z_S$ of the power-receiving side seen from the power source represented by Formula (16) or Formula (33) changes according to a fluctuation in the impedance $Z_{2r}$ of the load. However, even in such a configuration, the impedance $Z_S$ being independent of the coupling coefficient is the same as that in the aforementioned embodiments.

Further, since the impedance $Z_{2r}$ is contained in the relational formula between the coupling coefficient k and the frequency f shown in Formula (39), a fluctuation in the impedance $Z_{2r}$ of the load gives rise to a change in the shape of the graph shown in FIG. 7 or 8. However, a combination (hereinafter, referred to as a singular solution) of the coupling coefficient k and the frequency f satisfying Formula (12) is present irrespective of the impedance $Z_{2r}$. Hereinafter, the singular solution in the circuit configuration of FIG. 4 will be described. For convenience of description, each of the elements 215, 217, 223, and 227 of the circuit configuration shown in FIG. 4 is a capacitor, and the capacitances of the elements 215, 217, 223, and 227 are denoted by $C_{S1}$, $C_{P1}$, $C_{S2}$, and $C_{P2}$, respectively. Meanwhile, some of these elements may be constituted by inductors. In addition, the presence of the singular solution is not limited to the circuit configuration of FIG. 4, and a singular solution can be determined likewise in the circuit configuration of FIG. 10.

When the relational formula of the currents $I_1$ and $I_2$ is determined from Formula (29), and Formula (12) is established, Formula (41) is established. Meanwhile, the relations of $Z_{S1i}=-1/(\omega C_{S1})$, $Z_{P1i}=-1/(\omega C_{P1})$, $Z_{S2i}=-1/(\omega C_{S2})$, and $Z_{P2i}=-1/(\omega C_{P2})$ are established.

$$\frac{\omega^2 L_2^2(\omega^4 C_{S2}^2 C_{P2}^2 Z_{2r}^2 + \omega^2(C_{S2}+C_{P2})^2)}{((1-\omega^2 L_2(C_{S2}+C_{P2}))^2 + \omega^2 C_{S2}^2 Z_{2r}^2(1-\omega^2 L_2 C_{P2})^2)} k^2 = 1 \quad \text{Formula (41)}$$

When Formula (41) is rearranged, Formula (42) is obtained.

$$(1-\omega^2 L_2(C_{S2}+C_{P2}))^2 - \omega^4 L_2^2(C_{S2}+C_{P2})^2 k^2 + (\omega^2 C_{S2}^2 (1-\omega^2 L_2 C_{P2})^2 - \omega^6 L_2^2 C_{S2}^2 C_{P2}^2 k^2) Z_{2r}^2 = 0 \quad \text{Formula (42)}$$

When Formula (43) is established, Formula (42) is established irrespective of the value of $Z_{2r}$.

$$(1-\omega^2 L_2(C_{S2}+C_{P2}))^2 - \omega^4 L_2^2(C_{S2}+C_{P2})^2 k^2 = 0$$

$$\omega^2 C_{S2}^2(1-\omega^2 L_2 C_{P2})^2 - \omega^6 L_2^2 C_{S2}^2 C_{P2}^2 k^2 = 0 \quad \text{Formula (43)}$$

When Formula (43) is solved, a positive solution and a negative solution are obtained as the solutions of the capacitances $C_{S2}$ and $C_{P2}$, but the actual capacitances $C_{S2}$ and $C_{P2}$ have positive values, and thus the positive solution is adopted. Meanwhile, the negative solution means that the element 223 is an inductor rather than a capacitor.

When the inductance of the power-receiving coil 121 is known, a predetermined frequency and a predetermined coupling coefficient are substituted into Formula (43), to thereby obtain the impedance of the element in which the predetermined frequency and the predetermined coupling coefficient are the singular solution. For example, the value of the predetermined frequency substituted into Formula (43) is determined to the upper limit $f_{max}$ or the lower limit $f_{min}$ of the variable range, and the value of the predetermined coupling coefficient is determined to the lower limit $k_{min}$ of the fluctuation range. In this manner, the singular solution can be arranged at the boundary of the variable range.

Figure 11A:
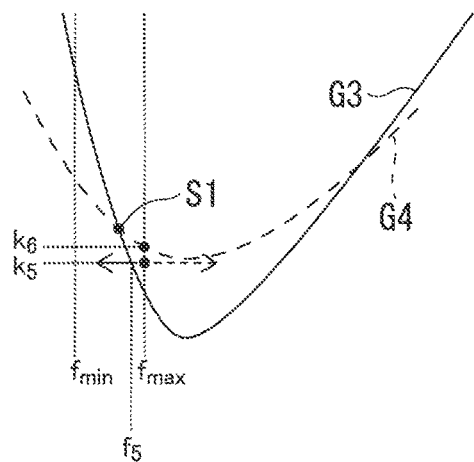
FIG. 11A is a graph showing an example of a relationship between a frequency and a coupling coefficient according to the modification example of the present disclosure.

Subsequently, reference will be made to FIGS. 11A and 11B to describe a change in the shape of a graph of the coupling coefficient k and the frequency f when the impedance $Z_{2r}$ of the load 225 fluctuates. First, as shown in FIG. 11A, a description will be given of a case where a singular solution S1 is within the variable range of the frequency f (except the boundary), and is within the fluctuation range of the coupling coefficient k (except the boundary). When the impedance $Z_{2r}$ of the load 225 increases, the graph of the coupling coefficient k and the frequency f changes from a graph G3 to a graph G4. Meanwhile, a description will be given of a case where, when $f_{max}$ is determined as the initial value of the frequency, the coupling coefficient is denoted by $k_5$ ($>k_{min}$). In this case, in the graph G3, the frequency $f_5$ satisfying Formula (12) is found by reducing the frequency. On the other hand, in the graph G4, it is necessary to increase the frequency, but the frequency is not able to be determined to be higher than $f_{max}$ and thus it is not possible to select a frequency satisfying Formula (12). For this reason, when the coupling coefficient satisfying Formula (12) is $k_6$ at $f_{max}$ in the graph G4, it is not possible to select a frequency satisfying Formula (12) at the coupling coefficient k ($k_{min} \leq k < k_6$). When the actual coupling coefficient k ($k_{min} \leq k < k_6$) is smaller than the coupling coefficient $k_6$ satisfying Formula (12) at the frequency $f_{max}$, the impedance $Z_S$ of the power-receiving side seen from the power source 111 is determined to a capacitive load. When the power source 111 is constituted by an inverter circuit, it is not possible to realize soft switching.

Figure 11B:
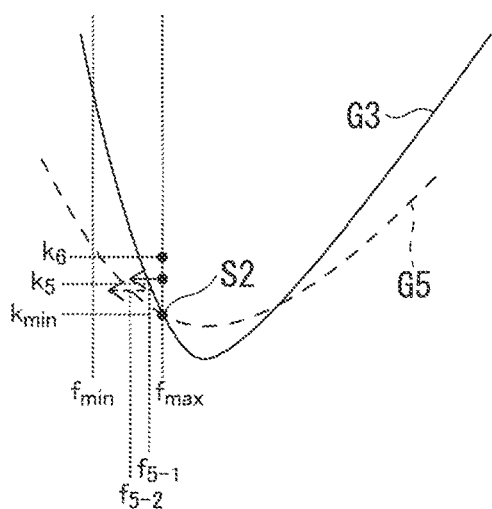
FIG. 11B is a graph showing an example of a relationship between the frequency and the coupling coefficient according to the modification example of the present disclosure.

As shown in FIG. 11B, a description will be given of a case where a singular solution S2 is the upper limit $f_{max}$ of the variable range of the frequency f, and is the lower limit $k_{min}$ of the fluctuation range of the coupling coefficient k. When the impedance $Z_{2r}$ of the load 225 increases, the graph of the coupling coefficient k and the frequency f changes from the graph G3 to a graph G5. In this case, when the frequency is $f_{max}$, and the coupling coefficient is $k_5$, a frequency $f_{5-1}$ satisfying Formula (12) is found by reducing the frequency in the graph G3. In addition, in the graph G5, a frequency $f_{5-2}$ satisfying Formula (12) is also found by reducing the frequency. Unlike FIG. 11A, it is possible to select a frequency satisfying Formula (12) even when the coupling coefficient k is within of a range of $k_{min} \leq k < k_6$. Therefore, it is possible to increase the range of the coupling coefficient satisfying Formula (12) in the variable range of the frequency f. In addition, since the actual coupling coefficient k is determined to be equal to or larger than the coupling coefficient $k_{min}$ satisfying Formula (12) at the frequency $f_{max}$, the impedance $Z_S$ of the power-receiving side seen from the power source 111 is determined to an inductive load. When the power source 111 is constituted by an inverter circuit, it is possible to realize soft switching. Further, even when the graph changes due to a fluctuation in the impedance $Z_{2r}$, it is possible to select a frequency satisfying Formula (12) through the same control of a decrease in frequency.

In the aforementioned embodiment of the present disclosure, the power-transmission efficiency of the power source of the power transmitter has been described, but it is also necessary to increase efficiency inside the power receiver in order to improve the power efficiency of the entire wireless power supply system. Hereinafter, an improvement in efficiency inside the power receiver will be examined with reference to FIG. 4. For convenience of description, each of the elements 223 and 227 of the circuit configuration shown in FIG. 4 is a capacitor, and the capacitances of the elements 223 and 227 are denoted by $C_{S2}$ and $C_{P2}$, respectively.

Figure 12:
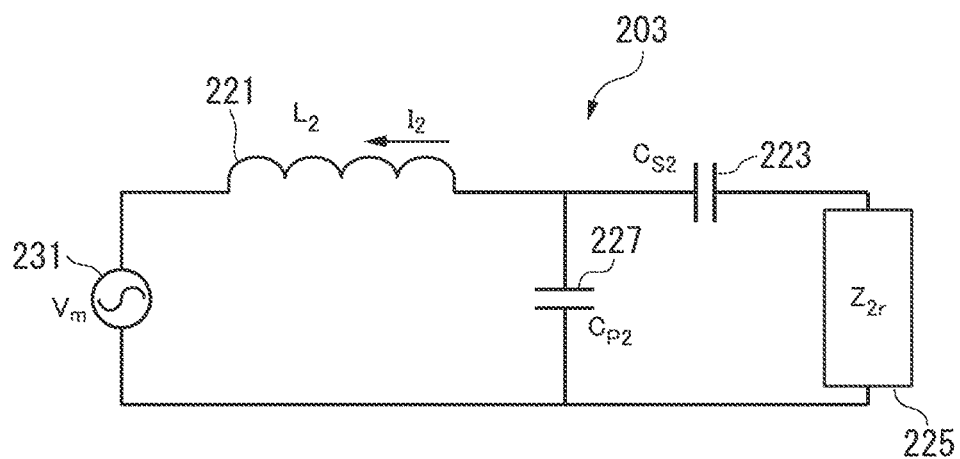
FIG. 12 is an equivalent circuit of a power receiver according to the modification example of the present disclosure.
Figure 13A:
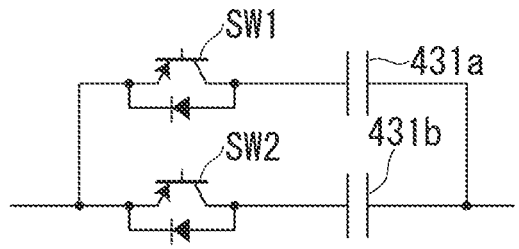
FIG. 13A is an example of a variable capacitor and a variable inductor according to the modification example of the present disclosure.
Figure 13B:
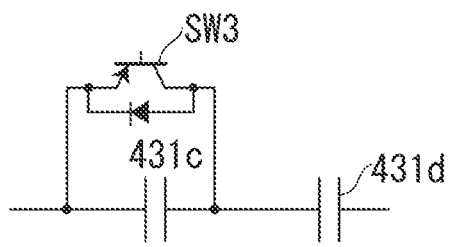
FIG. 13B is an example of a variable capacitor and a variable inductor according to the modification example of the present disclosure.
Figure 13C:
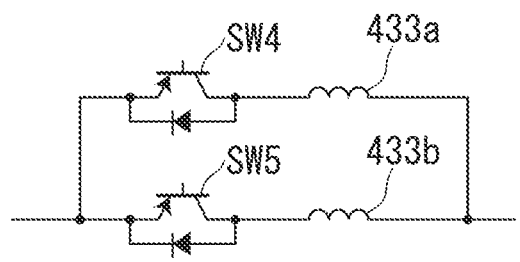
FIG. 13C is an example of a variable capacitor and a variable inductor according to the modification example of the present disclosure.
Figure 13D:
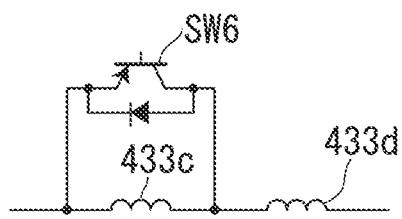
FIG. 13D is an example of a variable capacitor and a variable inductor according to the modification example of the present disclosure.

An electromotive force $V_m$ is induced to the power-receiving coil 221 by magnetic coupling to the power-transmitting coil 213, and the power receiver 203 is represented by an equivalent circuit as shown in FIG. 12. The electromotive force $V_m$ is represented by Formula (44).

$$V_m = j\omega k\sqrt{L_1 L_2} I_1 \quad \text{Formula (44)}$$

In addition, the circuit equation of FIG. 12 is represented by Formula (45).

$$j\omega k\sqrt{L_1 L_2}\, I_1 + \left( j\omega L_2 + \frac{\omega^2 C_{S2}^2 Z_{2r}^2 - j\omega((C_{S2}+C_{P2})+\omega^2 C_{S2}^2 C_{P2} Z_{2r}^2)}{\omega^4 C_{P2}^2 C_{S2}^2 Z_{2r}^2 + \omega^2(C_{S2}+C_{P2})^2} \right) I_2 = 0 \quad \text{Formula (45)}$$

When Formula (44) is substituted into Formula (45) and a current $I_2$ is solved, Formula (46) is derived.

$$I_2 = -\frac{\begin{pmatrix} \omega^2 C_{S2}^2 Z_{2r} + \\ j\omega(\omega^2 C_{S2}^2 C_{P2} Z_{2r}^2 (1-\omega^2 L_2 C_{P2}) + \\ (C_{S2}+C_{P2})(1-\omega^2 L_2(C_{S2}+C_{P2}))) \end{pmatrix}}{(1-\omega^2 L_2(C_{S2}+C_{P2}))^2 + \omega^2 C_{S2}^2 Z_{2r}^2 (1-\omega^2 L_2 C_{P2})^2} V_m \quad \text{Formula (46)}$$

In order to increase the efficiency inside the power receiver, a phase difference between the electromotive force induced to the power-receiving coil 221 and the current $I_2$ of the power-receiving coil 221 may be brought close to 0°. Thus, when the phase difference is 0°, and the imaginary part of Formula (46) is not present, the efficiency inside the power receiver becomes largest. This is equivalent to a case where Formula (47) is established. In this case, when desired electric power is supplied to the load 225, reactive power inside the power receiver is not present. Therefore, it is possible to reduce the current of the power-receiving coil, and to limit the generation of heat in an element or a wiring.

$$\omega^2 C_{S2}^2 C_{P2} Z_{2r}^2 (1-\omega^2 L_2 C_{P2}) + (C_{S2}+C_{P2})(1-\omega^2 L_{2r}(C_{S2}+C_{P2})) = 0 \quad \text{Formula (47)}$$

A conditional formula for increasing the efficiency inside the power receiver is derived in the circuit configuration of FIG. 10 in a similar manner without being derived with the limitation of the circuit configuration of FIG. 4.

In the circuit configuration of FIG. 4, when the impedance of the power-receiving coil 221 is determined in advance, and any given value is selected with each of the frequency f (angular frequency ω), the coupling coefficient k and the impedance $Z_{2r}$ of the load, variables are two impedances of the elements 223 and 227. Therefore, when two conditional formulas of Formula (41) which is an establishment condition of Formula (12) and Formula (47) which is a maximum efficiency condition are given, each of the impedances of the element 223 and 227 is determined to a specific value. That is, considering the establishment condition of Formula (12) and the maximum efficiency condition, a desired frequency f and a desired coupling coefficient k do not satisfy Formula (43). In addition, when the singular solution is determined to a desired value, each of the impedances of the elements 223 and 227 is determined to a specific value in Formula (43), and thus the maximum efficiency condition is not satisfied simultaneously.

On the other hand, in the circuit configuration of FIG. 10, the element 329 is provided in addition to the elements 323 and 327, and thus the number of variables is three. For convenience of description, each of the elements 323, 327, and 329 of the circuit configuration of FIG. 10 is a capacitor, and the capacitances of the elements 323, 327, and 329 are denoted by $C_{S2}$, $C_{P2}$, and $C_{Sf2}$, respectively. When Formula (12) is established, Formula (48) is established similarly to Formula (41), and Formula (49) to which a singular solution is given is obtained from Formula (48). In addition, similarly to a case of the circuit configuration of FIG. 4, Formula (50) is obtained as the maximum efficiency condition.

$$\frac{\omega^2 L_2^2(\omega^2(C_{S2}+C_{P2})^2 + \omega^4 C_{P2}^2 C_{S2}^2 Z_{2r}^2)}{\omega^2 C_{S2}^2 Z_{2r}^2 \left(1-\omega^2 L_2 C_{P2}+\frac{C_{P2}}{C_{Sf2}}\right)^2 + \left(1-\omega^2 L_2(C_{S2}+C_{P2})+\frac{(C_{S2}+C_{P2})}{C_{Sf2}}\right)^2} k^2 = 1 \quad \text{Formula (48)}$$

$$\omega^4 L_2^2 k^2 (C_{S2}+C_{P2})^2 - \left(1-\omega^2 L_2(C_{S2}+C_{P2})+\frac{(C_{S2}+C_{P2})}{C_{Sf2}}\right)^2 = 0 \quad \text{Formula (49)}$$

$$\left(1-\omega^2 L_2 C_{P2}+\frac{C_{P2}}{C_{Sf2}}\right)^2 - \omega^4 L_2^2 k^2 C_{P2}^2 = 0 \quad \text{Formula (50)}$$

$$(C_{S2}+C_{P2})\left(1-\omega^2 L_2(C_{S2}+C_{P2})+\frac{(C_{S2}+C_{P2})}{C_{Sf2}}\right) + \left(1-\omega^2 C_{P2} L_2+\frac{C_{P2}}{C_{Sf2}}\right)\omega^2 C_{S2}^2 C_{P2} Z_{2r}^2 = 0$$

Since variables are three impedances of the elements 323, 327, and 329, and conditional formulas are total three of two formulas in Formula (49) and one formula in Formula (50), each of the impedances of the elements 323, 327, and 329 satisfying the maximum efficiency condition is determined to a specific value while the singular solution is determined to a desired value. In addition, even when there is a separate condition other than the maximum efficiency condition for setting any characteristics, by combining this separate condition and Formula (49), and the impedance of an element satisfying the separate condition is determined while the singular solution is determined to a desired value. For example, when the impedance of the element 329 is determined to be a certain value, each of the impedances of the elements 323 and 327 satisfying Formula (49) is determined to a specific value. Therefore, when it is difficult to define a desired condition as a formula, it is possible to confirm whether the desired condition is satisfied in a case where the impedance of the element 329 is a certain value. When the desired condition is not satisfied, it is possible to adjust the impedance of the element 329 so that the desired condition is satisfied by changing the impedance of the element 329.

In the description of the aforementioned embodiment of the present disclosure, it has been assumed that the impedance of the element is fixed and does not change, but the present disclosure is not limited to such an aspect. For example, the element of the power receiver may be constituted by a variable element (variable inductor or variable capacitor). In this case, the impedance of the power-receiving side seen from the power source can made to be independent of the coupling coefficient by changing the impedance (imaginary impedance) of the element of the power receiver rather than the frequency f, or by changing the impedance (imaginary impedance) of the element of the power receiver as well as the frequency f when the coupling coefficient k changes. Meanwhile, the control of change in the imaginary impedance of the element may be performed by the aforementioned power-transmission-side controller. In this case, the power-transmission-side controller is configured to perform the following. Specifically, when the coupling coefficient k changes, the power-transmission-side controller can specify the value of the imaginary impedance of the element so that the impedance of the power-receiving side seen from the power source is independent of the coupling coefficient k. The power-transmission-side controller can instruct the power-receiving-side controller to set the imaginary impedance of the element to this value through the communication portion.

In the description of the aforementioned embodiment or modification example of the present disclosure, the frequency or the imaginary impedance of the element is controlled and changed by the transmission-side controller. However, the aforementioned power-receiving-side controller may be configured to control and change the frequency or the imaginary impedance of the element.

In this case, the power-receiving-side controller may acquire information required to the control from the transmission-side controller through the aforementioned communication portion. That is, when the coupling coefficient k changes, the power-receiving-side controller can specify the value of the frequency of AC power which is output by the power source so that the impedance of the power-receiving side seen from the power source is independent of the coupling coefficient k. The power-receiving-side controller can instruct the power-transmission-side controller to set the frequency of the AC power which is output by the power source to this value. In addition, when the coupling coefficient k changes, the power-receiving-side controller may regulate the imaginary impedance of the element of the power receiver so that the impedance of the power-receiving side seen from the power source is independent of the coupling coefficient k.

Further, the wireless power supply system of the present disclosure may be configured such that operational effects of the embodiment or the modification example are obtained. Therefore, when the coupling coefficient k changes, the wireless power supply system of the present disclosure may be configured to regulate at least one of the frequency of the AC power which is output by the power source and the imaginary impedance of the element so that the impedance of the power-receiving side seen from the power source is independent of the coupling coefficient k.

As shown in FIGS. 13A through 13D, an example of a variable capacitor or a variable inductor is a circuit in which a plurality of capacitors 431a through 431d or inductors 433a through 433d having different impedances are coupled to each other through switching elements SW1 to SW6. By power-receiving-side controller switching the switching elements SW1 through SW6, it is possible to switch elements which are used among the capacitors 431a through 431d and the inductors 433a through 433d, and to change the values of the capacitance and inductance of the circuit. The value of the capacitance or inductance of the circuit changes, and thus a relationship between the frequency f and the coupling coefficient k satisfying Formula (12) changes. Therefore, by changing the value of the capacitance or inductance of the circuit, it is possible to increase the range of the coupling coefficient k satisfying Formula (12) in the variable range of the frequency f. In addition, the variable capacitor or the variable inductor may include not only a circuit in which the value of capacitance or inductance changes selectively and discontinuously as shown in FIGS. 13A through 13D, but also a circuit in which the above value changes continuously as in a variable transformer, a trimmer capacitor or the like.

In the description of the embodiment of the present disclosure, it is assumed that the voltage or the current in the wireless power supply system is a sine wave. However, when the voltage or the current is not a sine wave and contains a plurality of frequency components, the present disclosure can be applied to a fundamental wave component.

When resistive components are present in the power-transmitting coil, the power-receiving coil and each element, the resistive components are disregarded to consider the power-transmitting coil, the power-receiving coil and each element as ideal inductance (coil) or capacitance, and thus the present disclosure can be used. Further, even when the resistive components and reactance components are present in wirings within the wireless power supply system, these resistive components and reactance components are disregarded, and thus the present disclosure can be used.

In the description of the embodiment of the present disclosure, application examples of the wireless power supply system include charging systems or driving systems of moving objects, home electric appliances or medical instruments, but the present disclosure is not limited to such an aspect. The present disclosure can be applied to, for example, various circuit devices which use the principle of electromagnetic induction of coils. Specifically, the wireless power supply system of the present disclosure can be incorporated into an insulation-type DC-DC converter.

In the description of the embodiment of the present disclosure, when a coupling coefficient changes, each parameter (the impedance of an element and the frequency) of the wireless power supply system is determined so that Formula (12) is established, but the present disclosure is not limited to such an aspect. Specifically, when the coupling coefficient changes, each parameter (the impedance of an element and the frequency) of the wireless power supply system may be determined so that Formula (51) is established.

$$\left|\frac{I_2}{I_1}\right| = K_I \sqrt{\frac{L_1}{L_2}} \qquad \text{Formula (51)}$$

First, a description will be provided with reference to the circuit configuration of FIG. 1. When Formula (51) is established, Formula (52) is established from Formula (11) and Formula (51). Meanwhile, $K_I$ is a coefficient (constant) which is determined in advance.

$$\frac{\omega^2 k^2 L_2^2}{Z_{2r}^2 + (\omega L_2 + Z_{S2i})^2} = K_I^2 \qquad \text{Formula (52)}$$

Each parameter (the impedance of the element, the frequency, and the coupling coefficient) of the wireless power supply system 100 is determined or controlled so that Formula (51) is established. In this case, Formula (52) is substituted into Formula (14), and thus Formula (14) becomes Formula (53).

$$Z_1 = \frac{L_1}{L_2}(K_I^2 Z_{2r} - j(K_I^2 Z_{S2i} + (K_I^2 - 1)\omega L_2)) \qquad \text{Formula (53)}$$

Thus, the impedance $Z_S$ of the power-receiving side seen from the power source 111 is represented by Formula (54).

$$Z_S = \frac{L_1}{L_2}\left(K_I^2 Z_{2r} + j\left(\frac{L_2}{L_1}Z_{S1i} - (K_I^2 Z_{S2i} + (K_I^2 - 1)\omega L_2)\right)\right) \qquad \text{Formula (54)}$$

From Formula (54), the impedance $Z_S$ of the power-receiving side seen from the power source 111 does not contain the coupling coefficient k. Therefore, the impedance $Z_S$ is independent of the coupling coefficient k. That is, even when the coupling coefficient changes, the frequency f is selected (determined) so that Formula (51) is established, and thus the impedance $Z_S$ is independent of the coupling coefficient k. That is, since the coefficient $K_I$ is constant and does not change, the right side of Formula (51) is a constant value. Therefore, the frequency f and the imaginary impedance $Z_{S2i}$ are determined so that the ratio of $I_2$ to $I_1$ keeps constant even when the coupling coefficient changes. As a result, the impedance $Z_S$ and the AC voltage $V_S$ ($=Z_S/I_1$) are not likely to fluctuate. Meanwhile, similar to other embodiments, when the element 123 of the power receiver 103 is a variable element, the impedance $Z_{S2i}$ of the element 123 rather than the frequency f may be changed so that Formula (51) is established. That is, when the frequency f, the imaginary impedance $Z_{S2i}$ and the coupling coefficient k are values which satisfy Formula (51), the impedance $Z_S$ is independent of the coupling coefficient k.

Further, in Formula (54), when the imaginary impedance $Z_{S1i}$ satisfies Formula (55), the imaginary part of Formula (54) is canceled, and the impedance $Z_S$ has only a real part as in Formula (56). In this case, the power factor of the power source 111 is 100%. On the other hand, the value of the imaginary impedance $Z_{S1i}$ is shifted from the value of Formula (55), and thus the power factor can be determined to a desired value without the impedance $Z_S$ depending on the coupling coefficient k.

$$Z_{S1i} = \frac{L_1}{L_2}(K_I^2 Z_{S2i} + (K_I^2 - 1)\omega L_2) \quad \text{Formula (55)}$$

$$Z_S = K_I^2 \frac{L_1}{L_2} Z_{2r} \quad \text{Formula (56)}$$

Meanwhile, when the frequency f is shifted from the value which satisfies Formula (51), Formula (57) is established. ε is an error.

$$\left|\frac{I_2}{I_1}\right| = (1+\varepsilon)K_I \sqrt{\frac{L_1}{L_2}} \quad \text{Formula (57)}$$

In this case, the impedance $Z_1$ of the power-receiving side seen from the power-transmitting coil 113 is represented by Formula (58), and the impedance $Z_S$ of the power-receiving side seen from the power source 111 is represented by Formula (59).

From Formula (59), even when the error ε occurs, the impedance $Z_S$ is independent of the coupling coefficient k.

$$Z_1 = K_I^2(1+\varepsilon)^2 \frac{L_1}{L_2} Z_{2r} - \quad \text{Formula (58)}$$
$$jK_I^2(1+\varepsilon)^2 \frac{L_1}{L_2} Z_{S2i} - j\frac{L_1}{L_2}(K_I^2(1+\varepsilon)^2 - 1)\omega L_2$$

$$Z_S = K_I^2(1+\varepsilon)^2 \frac{L_1}{L_2} Z_{2r} - \quad \text{Formula (59)}$$
$$jK_I^2(1+\varepsilon)^2 \frac{L_1}{L_2} Z_{S2i} - j\frac{L_1}{L_2}(K_I^2(1+\varepsilon)^2 - 1)\omega L_2 + j$$

When the imaginary impedance $Z_{S1i}$ satisfies Formula (55), Formula (59) becomes Formula (60). When Formula (60) is compared with Formula (56), shifting of the frequency f from a value which satisfies Formula (51) means that it is possible to control the real part of the impedance $Z_S$ and the power factor. In addition, by selecting the frequency f so that Formula (57) is satisfied, constant electric power can be supplied to the load 125 even when the parameters (for example, the inductances $L_1$ and $L_2$) fluctuate or the load 125 fluctuates.

$$Z_S = K_I^2(1+\varepsilon)^2 \frac{L_1}{L_2} Z_{2r} + jK_I^2 \frac{L_1}{L_2}(1-(1+\varepsilon)^2)(Z_{S2i} - \omega L_2) \quad \text{Formula (60)}$$

Figure 14:
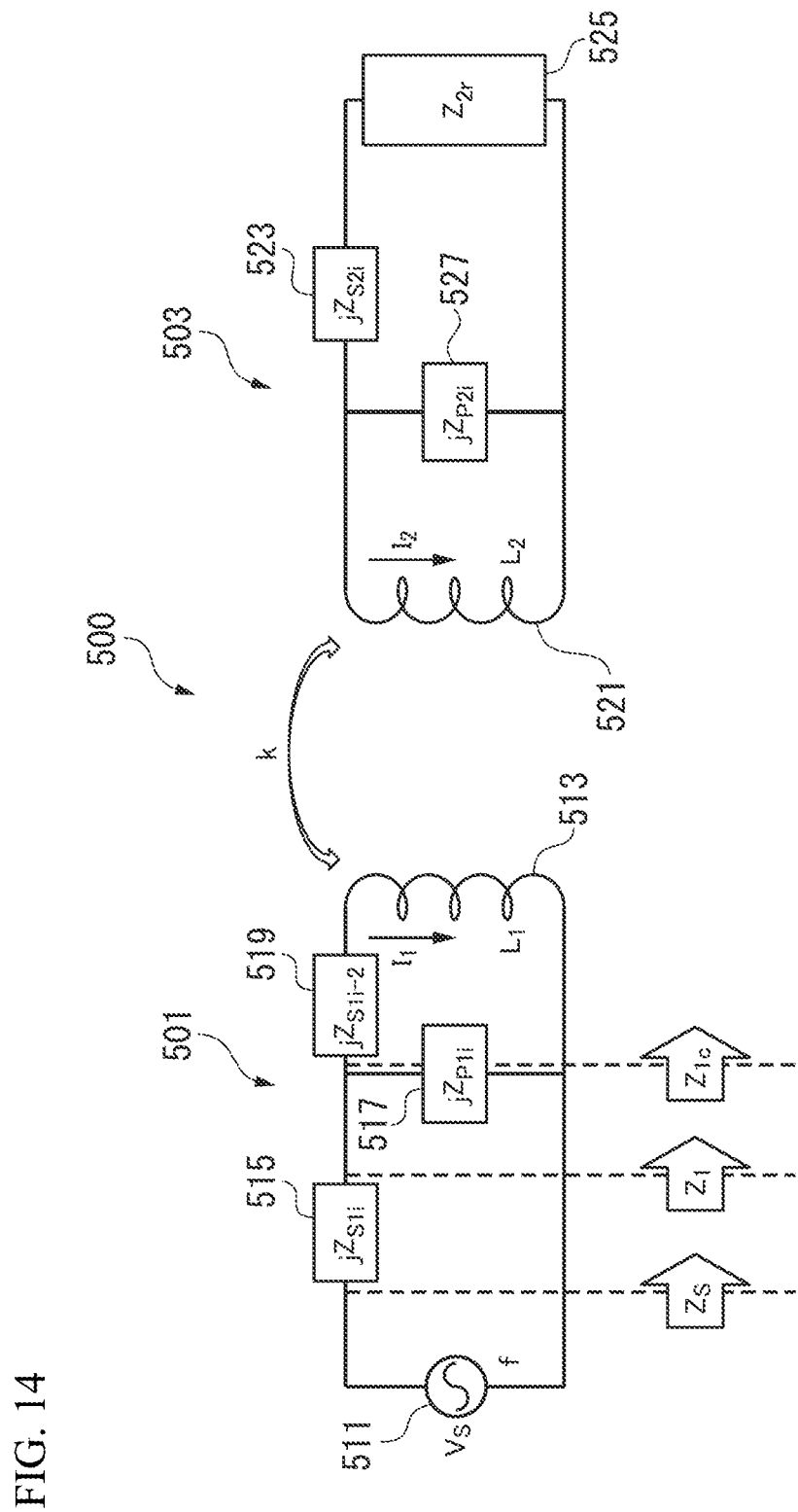
FIG. 14 is a circuit diagram of a wireless power supply system according to the modification example of the present disclosure.

Subsequently, a description will be provided with reference to the circuit configuration of FIG. 14. The circuit configuration of FIG. 14 is a circuit configuration obtained by adding an element 519 to the circuit configuration of FIG. 4. That is, components 511, 513, 515 and 517 of a power transmitter 501 and components 521, 523 and 527 of a power receiver 503 of FIG. 14 are the same as the components 211, 213, 215 and 217 of the power transmitter 201 and the components 221, 223 and 227 of the power receiver 203 of FIG. 4, respectively. Further, a load 525 coupled to the power receiver 503 is the same as the load 225 coupled to the power receiver 203.

The description of these components is the same as the description of FIG. 4, and thus the description of these components will not be repeated.

The element 519 is coupled in series to the power-transmitting coil 513 and coupled to the power-transmitting coil side rather than the element 517, and has imaginary impedance $jZ_{S1i-2}$. That is, the element 519 is coupled in series to the power-transmitting coil 513 at a position closer to the power-transmitting coil 513 than the element 517. The element 519 corresponds to the element 319 of FIG. 10. The element 519 is constituted, for example, by a reactance element such as an inductor (reactor, coil) or a capacitor, or a plurality of elements of a combination of such elements.

When the circuit equation of FIG. 14 is set up, Formula (61) is established.

$$\begin{bmatrix} j\omega L_1 + jZ_{S1i-2} + j\dfrac{Z_{S1i}Z_{P1i}}{Z_{S1i} + Z_{P1i}} & j\omega k\sqrt{L_1 L_2} \\ j\omega k\sqrt{L_1 L_2} & j\omega L_2 + \dfrac{jZ_{P2i}(Z_{2r} + jZ_{S2i})}{Z_{2r} + jZ_{S2i} + jZ_{P2i}} \end{bmatrix}$$
$$\begin{bmatrix} I_1 \\ I_2 \end{bmatrix} = \begin{bmatrix} \dfrac{Z_{P1i}}{Z_{S1i} + Z_{P1i}} V_S \\ 0 \end{bmatrix} \quad \text{Formula (61)}$$

When Formula (52) is established, the result of determining the impedance $Z_{1C}$ (impedance which includes the element 519) of the power-receiving side seen from the element 519 is determined to a value represented by Formula (62), and this formula does not contain the coupling coefficient k.

$$Z_{1c} = K_I^2 \frac{L_1}{L_2}\left(\frac{jZ_{P2i}(Z_{2r} + jZ_{S2i})}{Z_{2r} + jZ_{S2i} + jZ_{P2i}}\right)^* + j\omega L_1(1 - K_I^2) + jZ_{S1i-2} \quad \text{Formula (62)}$$

Here, when the impedance value of the element 519 is determined so that Formula (63) is established, the impedance $Z_{1C}$ is represented by Formula (64). Meanwhile, in order to prevent the impedance of the element 519 from being 0, the coefficient $K_I$ is set to a value larger than 0 and smaller than 1, or a value larger than 1.

$$Z_{S1i-2} = -\omega L_1(1 - K_I^2) \quad \text{Formula (63)}$$

-continued $$Z_{1c} = K_I^2 \frac{L_1}{L_2} \left( \frac{jZ_{P2i}(Z_{2r} + jZ_{S2i})}{Z_{2r} + jZ_{S2i} + jZ_{P2i}} \right)^* \quad \text{Formula (64)}$$

Then, the result of determining the impedance $Z_1$ (impedance which includes the element 517) of the power-receiving side seen from the element 517 is determined to a value represented by Formula (65), and this formula does not contain the coupling coefficient k.

$$Z_1 = K_I^2 \frac{L_1}{L_2} \frac{Z_{P1i}Z_{P2i}(Z_{2r} + jZ_{S2i})^*}{\left(Z_{P1i} - K_I^2 \frac{L_1}{L_2} Z_{P2i}\right)(jZ_{2r} + Z_{S2i}) + Z_{P1i}Z_{P2i}} \quad \text{Formula (65)}$$

When the impedance values of the element 517 and the element 527 are determined so that Formula (66) is established, Formula (67) is established from Formula (65) and Formula (66).

$$Z_{P1i} = K_I^2 \frac{L_1}{L_2} Z_{P2i} \quad \text{Formula (66)}$$

$$Z_1 = K_I^2 \frac{L_1}{L_2} (Z_{2r} + jZ_{S2i})^* \quad \text{Formula (67)}$$

Thus, the impedance $Z_S$ (impedance which does not include the power source 511) of the power-receiving side seen from the power source 511 is determined to a value represented by Formula (68).

$$Z_S = K_I^2 \frac{L_1}{L_2} \left( Z_{2r} + j \left( \frac{1}{K_I^2} \frac{L_2}{L_1} Z_{S1i} - Z_{S2i} \right) \right) \quad \text{Formula (68)}$$

From Formula (68), the impedance $Z_S$ of the power-receiving side seen from the power source 511 is independent of the coupling coefficient k. In addition, the real part of the impedance $Z_S$ is represented only by the impedance of the load 525, the self-inductances of the power-transmitting coil 513 and the power-receiving coil 521 and the coefficient $K_I$, and is not influenced by the impedances of the elements 515, 517, 519, 523 and 527.

Further, in Formula (68), when the imaginary impedance $Z_{S1i}$ satisfies Formula (69), the imaginary part of Formula (68) is canceled, and the impedance $Z_S$ has only a real part as in Formula (70). In this case, the power factor of the power source 511 is 100%. On the other hand, the value of the imaginary impedance $Z_{S1i}$ is shifted from the value of Formula (69), and thus the power factor can be determined to a desired value without the impedance $Z_S$ depending on the coupling coefficient k.

$$Z_{S1i} = K_I^2 \frac{L_1}{L_2} Z_{S2i} \quad \text{Formula (69)}$$

$$Z_S = K_I^2 \frac{L_1}{L_2} Z_{2r} \quad \text{Formula (70)}$$

Meanwhile, in the circuit configuration of FIG. 10, when the impedance values of the element 319 and the element 329 are determined so that Formula (71) is established, it is possible to derive formulas similar to the above-described formulas.

$$Z_{S1i-2} = -\omega L_1 (1 - K_I^2) + K_I^2 \frac{L_1}{L_2} Z_{S2i-2} \quad \text{Formula (71)}$$

Formula (52) is rearranged to the following Formula (72).

$$\frac{\omega^2 (k/K_I)^2 L_2^2}{Z_{2r}^2 + (\omega L_2 + Z_{S2i})^2} = \frac{\omega^2 k_a^2 L_2^2}{Z_{2r}^2 + (\omega L_2 + Z_{S2i})^2} = 1 \quad \text{Formula (72)}$$

$$(k_a = k/K_I)$$

Formula (72) is different from Formula (13) only in a point where the actual coupling coefficient k is changed to an apparent coupling coefficient $k_a$. Accordingly, the aforementioned designing method and control method of a wireless power supply system based on Formula (12) can be applied to designing method and control method of a wireless power supply system based on Formula (52).

Subsequently, reference will be made to the circuit configurations of FIG. 1 and FIG. 4 to describe change in the current $I_2$ flowing through the power-receiving coil when the coefficient $K_I$ is other than 1 compared with a case when the coefficient $K_I$ is 1.

When the coefficient $K_I$ is 1, in the circuit configuration of FIG. 1, Formula (73) is established from Formula (11) and Formula (12).

$$\left| \frac{j\omega L_2}{Z_{2r} + j(\omega L_2 + Z_{S2i})} \right| = \frac{1}{k} \quad \text{Formula (73)}$$

The left side of Formula (73) is equivalent to a response magnification $Q(\omega)$ of a circuit constituted by the power receiver 103 and the load 125. The response magnification $Q(\omega)$ becomes a resonance magnification $Q_C (\omega_C L_2/Z_{2r})$ at a resonance frequency $\omega_C (=-Z_{S2i}/L_2)$ of this circuit. When $Q(\omega_0)$ at a frequency $(\omega_0)$ which satisfies Formula (73) becomes larger, $Q_C$ also becomes larger proportionally to $Q(\omega_0)$. Accordingly, the establishment of Formula (12) (or Formula (73)) means that the relation of Formula (74) is also established.

$$Q_C \propto \frac{1}{k} \quad \text{Formula (74)}$$

That is, when Formula (12) is established and the coupling coefficient k becomes smaller, the resonance magnification $Q_C$ becomes larger.

Here, the response magnification in the circuit configuration of FIG. 4 will be described. The response magnification $Q(\omega)$ of FIG. 4 is represented by Formula (75).

$$Q(\omega) = \left| \frac{j\omega L_2}{\frac{Z_{P2i}^2}{Z_{2r}^2 + (Z_{S2i} + Z_{P2i})^2} Z_{2r} + j \left( \omega L_2 + \frac{Z_{P2i}(Z_{2r}^2 + Z_{S2i}(Z_{S2i} + Z_{P2i}))}{Z_{2r}^2 + (Z_{S2i} + Z_{P2i})^2} \right)} \right| \quad \text{Formula (75)}$$

Since the resonance magnification $Q_C$ is a case when an imaginary part of a denominator of Formula (75) is 0, the resonance magnification $Q_C$ is represented by Formula (76).

$$Q_C = \frac{Z_{2r}^2 + (Z_{S2i} + Z_{P2i})^2}{Z_{P2i}^2} \frac{\omega_C L_2}{Z_{2r}} \quad \text{Formula (76)}$$

Here, the ratio of the current $I_2$ flowing through the power-receiving coil 221 to the current $I_L$ flowing through the load 225 is represented by Formula (77).

$$\frac{I_2}{I_L} = \frac{Z_{2r} + j(Z_{S2i} + Z_{P2i})}{jZ_{P2i}} \quad \text{Formula (77)}$$

Formula (76) becomes Formula (78) from Formula (77).

$$Q_C = \left|\frac{I_2}{I_L}\right|^2 \frac{\omega_C L_2}{Z_{2r}} \quad \text{Formula (78)}$$

The relation of Formula (79) is established from Formula (74) and Formula (78).

$$\left|\frac{I_2}{I_L}\right|^2 \frac{\omega_C L_2}{Z_{2r}} \propto \frac{1}{k} \quad \text{Formula (79)}$$

Formula (79) shows that the current $I_2$ flowing through the power-receiving coil 221 becomes larger as the coupling coefficient k becomes smaller.

Hereinabove a case in which the coefficient $K_I$ is 1 (that is, Formula (12) is established) has been described. Hereunder, change in the current $I_2$ flowing through the power-receiving coil when the coefficient $K_I$ is other than 1 will be described. When Formula (51) is established, Formula (80) is established rather than Formula (73).

$$\left|\frac{j\omega L_2}{Z_{2r} + j(\omega L_2 + Z_{S2i})}\right| = \frac{K_I}{k} \quad \text{Formula (80)}$$

Similar to the derivation of Formula (79), when Formula (51) is established, the relation of Formula (81) is established.

$$\left|\frac{I_2}{I_L}\right|^2 \frac{\omega_C L_2}{Z_{2r}} \propto \frac{K_I}{k} \quad \text{Formula (81)}$$

When constant electric power is supplied to the load 225, by setting the range of the coefficient $K_I$ to $0<K_I<1$, it is possible to reduce the current $I_2$ flowing through the power-receiving coil 221 compared with a case where Formula (12) is established.

When the wireless power supply system is applied to a charging system of an electric vehicle, for example, the power receiver is mounted on the electric vehicle. In this case, it may be desired to reduce the size of the power receiver since the installation location of the power receiver on the electric vehicle is limited. In order to reduce the size of the power receiver, the conducting wire forming the power-receiving coil may be made thinner, for example. When making the conducting wire thinner, the electric resistance of the conducting wire increases, and thus the calorific value increases. Accordingly, as shown in Formula (73), by setting the range of the coefficient $K_I$ to $0<K_I<1$, it is possible to reduce the current $I_2$ compared with a case where Formula (12) is established, and thus it is possible to reduce the calorific value.

Meanwhile, in the same manner as is described above, when it is desired to reduce the current $I_1$ flowing through the power-transmitting coil 213, the range of the coefficient $K_I$ is set so as to satisfy $1<K_I$.

In the embodiments and the modification examples, the wireless power supply system including the power transmitter and the power receiver is described. However, the present disclosure is not limited to such a configuration, and the present disclosure may be applied to a power receiver that receives electric power wirelessly from a power transmitter including a power-transmitting coil to which AC power of a frequency is input from a power source. This power receiver includes the same configuration as that of the power receiver 103, 203 or 303 described in the embodiments and the modification examples. That is, the power receiver of the present disclosure includes a power-receiving coil magnetically coupled to the power-transmitting coil at a coupling coefficient, and a power-receiving-side series element (first power-receiving-side series element) which is coupled in series to the power-receiving coil and which has imaginary impedance $jZ_{S2i}$. The power-receiving coil may have the same configuration as that of the power-receiving coil 121, 221 or 321, and the power-receiving-side series element may have the same configuration as that of the element 123, 223 or 323. In the power receiver of the present disclosure, the frequency of AC power which is output by the power source and the imaginary impedance of the power-receiving-side series element may be determined so that the impedance of the power-receiving side seen from the power source is independent of the coupling coefficient k when the coupling coefficient k changes. In other words, the power receiver of the present disclosure may be configured to regulate at least one of the frequency of the AC power which is output by the power source and the imaginary impedance of the power-receiving-side series element so that the impedance of the power-receiving side seen from the power source is independent of the coupling coefficient k when the coupling coefficient k changes. The power receiver may instruct the power source to change a frequency through a communication portion or the like.

INDUSTRIAL APPLICABILITY

According to the present disclosure, it is possible to provide a wireless power supply system and a power receiver which are capable of suppressing a fluctuation in impedance of a power-receiving side seen from a power source, when a coupling coefficient changes.

What is claimed is:
1. A wireless power supply system comprising:
a power transmitter; and
a power receiver,
the power transmitter comprising a power-transmitting coil to which AC power of a frequency is input from a power source, and
the power receiver comprising: a power-receiving coil magnetically coupled to the power-transmitting coil at a coupling coefficient; and a first power-receiving-side series element coupled in series to the power-receiving coil and having imaginary impedance $jZ_{S2i}$,
wherein the frequency, the coupling coefficient and the imaginary impedance are determined on the basis of satisfying the following formula,

$$\left|\frac{I_2}{I_1}\right| = K_I \sqrt{\frac{L_1}{L_2}} \qquad \text{Formula (1)}$$

where $L_1$ is self-inductance of the power-transmitting coil, $L_2$ is self-inductance of the power-receiving coil, $I_1$ is a current flowing through the power-transmitting coil, $I_2$ is a current flowing through the power-receiving coil, and $K_I$ is a coefficient.

2. The wireless power supply system according to claim 1, wherein the coefficient $K_I$ is a value larger than 0 and smaller than 1, or a value larger than 1.

3. The wireless power supply system according to claim 2, wherein:
the power transmitter further comprises:
a power-transmission-side parallel element coupled in parallel to the power-transmitting coil and having imaginary impedance $jZ_{P1i}$; and
a first power-transmission-side series element coupled in series to the power-transmitting coil at a position closer to the power-transmitting coil than the power-transmission-side parallel element and having imaginary impedance $jZ_{S1i-2}$;
the power receiver further comprises a power-receiving-side parallel element coupled in parallel to the power-receiving coil at a position closer to the power-receiving coil than the first power-receiving-side series element and having imaginary impedance $jZ_{P2i}$;
the imaginary impedance of the first power-transmission-side series element satisfies the following formula; and $$Z_{S1i-2} = -\omega L_1(1 - K_I^2) \qquad \text{Formula (2)}$$

the imaginary impedances of the power-transmission-side parallel element and the power-receiving-side parallel element satisfy the following formula.

$$Z_{P1i} = K_I^2 \frac{L_1}{L_2} Z_{P2i} \qquad \text{Formula (3)}$$

4. The wireless power supply system according to claim 3, wherein:
a variable range of the frequency is determined;
a fluctuation range of the coupling coefficient is determined; and
the imaginary impedances of the first power-receiving-side series element and the power-receiving-side parallel element are determined so as to satisfy Formula (1), when the frequency is an upper limit or a lower limit of the variable range and the coupling coefficient is an upper limit or a lower limit of the fluctuation range.

5. The wireless power supply system according to claim 4, wherein the imaginary impedances of the first power-receiving-side series element and the power-receiving-side parallel element are determined so that a phase difference between an electromotive force induced in the power-receiving coil by magnetic coupling of the power-transmitting coil to the power-receiving coil and the current of the power receiving coil is 0°.

6. The wireless power supply system according to claim 4, wherein:
a load whose impedance fluctuates is coupled to the power receiver; and
the imaginary impedances of the first power-receiving-side series element and the power-receiving-side parallel element are determined so as to satisfy Formula (1) irrespective of the impedance of the load, when the frequency is the upper limit or the lower limit of the variable range and the coupling coefficient is the lower limit of the fluctuation range.

7. The wireless power supply system according to claim 3, wherein the first power-receiving-side series element is an inductor, and the power-receiving-side parallel element is a capacitor.

8. The wireless power supply system according to claim 3, wherein the first power-receiving-side series element and the power-receiving-side parallel element are capacitors.

9. The wireless power supply system according to claim 2, wherein:
the power transmitter further comprises:
a power-transmission-side parallel element coupled in parallel to the power-transmitting coil and having imaginary impedance $jZ_{P1i}$; and
a first power-transmission-side series element coupled in series to the power-transmitting coil at a position closer to the power-transmitting coil than the power-transmission-side parallel element and having imaginary impedance $jZ_{S1i-2}$;
the power receiver further comprises:
a power-receiving-side parallel element coupled in parallel to the power-receiving coil at a position closer to the power-receiving coil than the first power-receiving-side series element and having imaginary impedance $jZ_{P2i}$; and
a second power-receiving-side series element coupled in series to the power-receiving coil at a position closer to the power-receiving coil than the power-receiving-side parallel element and having imaginary impedance $jZ_{S2i-2}$;
the imaginary impedances of the first power-transmission-side series element and the second power-receiving-side series element satisfy the following formula; and $$Z_{S1i-2} = -\omega L_1(1 - K_I^2) + K_I^2 \frac{L_1}{L_2} Z_{S2i-2} \qquad \text{Formula (4)}$$

the imaginary impedances of the power-transmission-side parallel element and the power-receiving-side parallel element satisfy the following formula.

$$Z_{P1i} = K_I^2 \frac{L_1}{L_2} Z_{P2i} \qquad \text{Formula (5)}$$

10. The wireless power supply system according to claim 9, wherein:
a variable range of the frequency is determined;
a fluctuation range of the coupling coefficient is determined; and
the imaginary impedances of the first power-receiving-side series element, the second power-receiving-side series element and the power-receiving-side parallel element are determined so as to satisfy Formula (1), when the frequency is an upper limit or a lower limit of the variable range and the coupling coefficient is an upper limit or a lower limit of the fluctuation range.

11. The wireless power supply system according to claim 10, wherein:

a load whose impedance fluctuates is coupled to the power receiver; and the imaginary impedances of the first power-receiving-side series element, the second power-receiving-side series element and the power-receiving-side parallel element are determined so as to satisfy Formula (1) irrespective of the impedance of the load, when the frequency is the upper limit or the lower limit of the variable range and the coupling coefficient is the lower limit of the fluctuation range.

12. The wireless power supply system according to claim 10, wherein the imaginary impedances of the first power-receiving-side series element, the second power-receiving-side series element and the power-receiving-side parallel element are determined so that a phase difference between an electromotive force induced in the power-receiving coil by magnetic coupling of the power-transmitting coil to the power-receiving coil and the current of the power receiving coil is 0°.

13. The wireless power supply system according to claim 9, wherein the first power-receiving-side series element is an inductor, and the second power-receiving-side series element and the power-receiving-side parallel element are capacitors.

14. The wireless power supply system according to claim 9, wherein the first power-receiving-side series element, the second power-receiving-side series element and the power-receiving-side parallel element are capacitors.

15. The wireless power supply system according to claim 1, wherein:

the power transmitter further comprises a power-transmission-side series element coupled in series to the power-transmitting coil and having imaginary impedance $jZ_{s1i}$; and the imaginary impedances of the power-transmission-side series element and the first power-receiving-side series element satisfy the following formula.

$$Z_{S1i} = \frac{L_1}{L_2}(K_I^2 Z_{S2i} + (K_I^2 - 1)\omega L_2) \quad \text{Formula (6)}$$

16. The wireless power supply system according to claim 3, wherein:

the power transmitter further comprises a power-transmission-side series element coupled in series to the power-transmitting coil at a position closer to the power source than the power-transmission-side parallel element and having imaginary impedance $jZ_{S1i}$; and the imaginary impedances of the power-transmission-side series element and the first power-receiving-side series element satisfy the following formula.

$$Z_{S1i} = K_I^2 \frac{L_1}{L_2} Z_{S2i} \quad \text{Formula (7)}$$

17. The wireless power supply system according to claim 9, wherein:

the power transmitter further comprises a second power-transmission-side series element coupled in series to the power-transmitting coil at a position closer to the power source than the power-transmission-side parallel element and having imaginary impedance $jZ_{S1i}$; and the imaginary impedances of the second power-transmission-side series element and the first power-receiving-side series element satisfy the following formula.

$$Z_{S1i} = K_I^2 \frac{L_1}{L_2} Z_{S2i} \quad \text{Formula (8)}$$

18. The wireless power supply system according to claim 2, wherein:

a fluctuation range of the coupling coefficient is determined; and the coefficient $K_I$ satisfies $0 < K_I < 1$.

19. The wireless power supply system according to claim 1, wherein:

a fluctuation range of the coupling coefficient is determined; and when the self-inductances of the power-transmitting coil and the power-receiving coil change on the basis of change in the coupling coefficient, the self-inductances of the power-transmitting coil and the power-receiving coil take values within a changing range of the self-inductances depending on change in the coupling coefficient within the fluctuation range.

20. A power receiver that receives electric power wirelessly from a power transmitter comprising a power-transmitting coil to which AC power of a frequency is input from a power source, the power receiver comprising:

a power-receiving coil magnetically coupled to the power-transmitting coil at a coupling coefficient; and a first power-receiving-side series element coupled in series to the power-receiving coil and having imaginary impedance $jZ_{S2i}$, wherein the frequency, the coupling coefficient and the imaginary impedance are determined on the basis of satisfying the following formula, $$\left|\frac{I_2}{I_1}\right| = K_I \sqrt{\frac{L_1}{L_2}} \quad \text{Formula (9)}$$

where $L_1$ is self-inductance of the power-transmitting coil, $L_2$ is self-inductance of the power-receiving coil, $I_1$ is a current flowing through the power-transmitting coil, $I_2$ is a current flowing through the power-receiving coil, and $K_I$ is a coefficient.

* * * * *